US012693532B2

(12) United States Patent
Anzai

(10) Patent No.: US 12,693,532 B2
(45) Date of Patent: Jul. 28, 2026

(54) VIRTUAL IMAGE DISPLAY APPARATUS, HEAD-UP DISPLAY SYSTEM, AND TRANSPORTATION MACHINE

(71) Applicant: FUJIFILM Corporation, Tokyo (JP)

(72) Inventor: Akihiro Anzai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 293 days.

(21) Appl. No.: 18/640,242

(22) Filed: Apr. 19, 2024

(65) Prior Publication Data

US 2024/0280809 A1 Aug. 22, 2024

Related U.S. Application Data

(63) Continuation of application No. PCT/JP2022/040748, filed on Oct. 31, 2022.

(30) Foreign Application Priority Data

Nov. 5, 2021 (JP) ................................ 2021-181368

(51) Int. Cl.
*G02B 27/01* (2006.01)
*B60K 35/22* (2024.01)
(Continued)

(52) U.S. Cl.
CPC .......... *G02B 27/0101* (2013.01); *B60K 35/22* (2024.01); *B60K 35/23* (2024.01); *B60K 35/50* (2024.01); *G02B 5/1861* (2013.01)

(58) Field of Classification Search
CPC .............. G02B 27/0101; G02B 5/1861; G02B 2027/0118; G02B 5/18; G02B 5/32;
(Continued)

(56) References Cited

U.S. PATENT DOCUMENTS

| | | | |
|---|---|---|---|
| 10,254,551 | B2 | 4/2019 | Kishigami et al. |
| 2004/0135742 | A1 | 7/2004 | Weber et al. |

(Continued)

FOREIGN PATENT DOCUMENTS

| | | | |
|---|---|---|---|
| JP | 2006-512622 A | 4/2006 |
| JP | 2017-15778 A | 1/2017 |

(Continued)

OTHER PUBLICATIONS

International Preliminary Report on Patentability and Written Opinion of the International Searching Authority for International Application No. PCT/JP2022/040748, dated May 16, 2024, with an English translation.

(Continued)

*Primary Examiner* — Collin X Beatty
(74) *Attorney, Agent, or Firm* — Birch, Stewart, Kolasch & Birch, LLP

(57) ABSTRACT

A virtual image display apparatus that is configured to be mounted in a transportation machine and is configured such that P-polarized image display light is incident into a projection portion, a head-up display system, and the transportation machine provided therewith, the virtual image display apparatus and head-up display system including an image display device that emits projection image light, a diffractive reflective element having positive optical power, and a half-wave plate having a front retardation of 200 nm to 400 nm, in which the diffractive reflective element and the half-wave plate are provided on an optical path that guides the projection image light to the projection portion, in order from a side of the image display device.

13 Claims, 6 Drawing Sheets

(51) Int. Cl.

| | |
|---|---|
| ***B60K 35/23*** | (2024.01) |
| ***B60K 35/50*** | (2024.01) |
| ***G02B 5/18*** | (2006.01) |

(58) Field of Classification Search

CPC ...... G02B 27/01; G02B 27/0103; G02B 5/30; B60K 35/22; B60K 35/23; B60K 35/50

See application file for complete search history.

(56) References Cited

U.S. PATENT DOCUMENTS

| | | | | |
|---|---|---|---|---|
| 2017/0269428 | A1 | 9/2017 | Otani et al. | |
| 2018/0180878 | A1 | 6/2018 | Yokoe et al. | |
| 2018/0348562 | A1 * | 12/2018 | Yoshida | G02F 1/13362 |
| 2019/0255946 | A1 | 8/2019 | Takahashi | |
| 2020/0012099 | A1 | 1/2020 | Kim et al. | |
| 2020/0103652 | A1 | 4/2020 | Onda et al. | |

FOREIGN PATENT DOCUMENTS

| | | | |
|---|---|---|---|
| JP | 2019-144415 | A | 8/2019 |
| JP | 2020-56880 | A | 4/2020 |
| JP | 2020-160296 | A | 10/2020 |
| JP | 2021-162703 | A | 10/2021 |
| WO | WO2009/014231 | A1 | 1/2009 |
| WO | WO 2016/147570 | A1 | 9/2016 |
| WO | WO 2019/049767 | A1 | 3/2019 |
| WO | WO 2020/184714 | A1 | 9/2020 |

OTHER PUBLICATIONS

International Search Report for International Application No. PCT/JP2022/040748, dated Dec. 6, 2022, with an English translation.

Extended European Search Report for European Application No. 22889935.7, dated Feb. 5, 2025.

* cited by examiner

VIRTUAL IMAGE DISPLAY APPARATUS, HEAD-UP DISPLAY SYSTEM, AND TRANSPORTATION MACHINE

CROSS-REFERENCE TO RELATED APPLICATIONS

This application is a Continuation of PCT International Application No. PCT/JP2022/040748 filed on Oct. 31, 2022, which claims priority under 35 U.S.C. § 119 (a) to Japanese Patent Application No. 2021-181368 filed in Japan on Nov. 5, 2021. Each of the above applications is hereby expressly incorporated by reference, in its entirety, into the present application.

BACKGROUND OF THE INVENTION

1. Field of the Invention

The present invention relates to a virtual image display apparatus, a head-up display system, and a transportation machine.

2. Description of the Related Art

A head-up display (hereinafter, also referred to as a "HUD") system is known which projects an image onto a windshield glass of a vehicle or the like and provides a driver or the like with driving support information such as route guidance, a running speed, and a warning through the windshield glass.

With the HUD system, the observer can obtain various driving support information, such as route guidance, running speed, and a vehicle state, without moving a visual line or a focus by a large amount while observing an outside world in front, and can perform driving more safely and without stress.

The basic configuration of the HUD is generally as follows. First, projection light from an image display device incorporated in a dashboard forms an image on a surface of an intermediate image screen (diffuser) as an intermediate image. The intermediate image is enlarged by a concave mirror (magnifying glass), is transmitted through a transmission window provided in a dashboard, is reflected by a windshield glass provided with a half mirror including a cholesteric liquid crystal layer, a dielectric multi-layer film, or the like, and is guided to a driver or the like. Hereinafter, the configuration of the projection from the image display device to the windshield is also referred to as a virtual image display apparatus.

The driver or the like recognizes the intermediate image as a so-called virtual image in front of the windshield glass. That is, the driver or the like can recognize as if the driving support information is floating on the road.

Various proposals have been made for a virtual image display apparatus that constitutes the HUD system. For example, JP2020-56880A describes a virtual image display apparatus in which a concave mirror is changed to a positive diffractive type optical element having positive optical power (hereinafter, also referred to as a positive diffractive reflective element). According to JP2020-56880A, the virtual image display apparatus having the above-described configuration can improve the robustness of visibility with the curvature of the virtual image. In addition, since the diffractive type optical element is a flat plate, the virtual image display apparatus can be easily reduced in size as compared to an HUD system using a concave mirror, and the mountability on a vehicle can be improved.

In a general HUD system, a projection image display apparatus of the HUD unit emits S-polarized light in many cases, and the S-polarized light is reflected by a windshield glass to allow a driver or the like to visually recognize a virtual image. In this case, since the image light is reflected from the front surface and the rear surface of the windshield glass, there is a problem in that double images are visible. In addition, since the image light is S-polarized light, there is a problem that the virtual image is not visible in a case where the driver wears polarizing sunglasses. In order to solve these problems, research on an HUD system in which a P-polarized light reflection film is incorporated into a windshield glass and the emitted light from the HUD unit is P-polarized has also been conducted.

In addition, as a technique for displaying a virtual image with multiple foci or in 3D, for example, as described in JP2020-160296A, a technique of using a light field display as a projection image display apparatus is known. In the light field display, by forming a microlens on the light emitting pixel, the focus for each light emitting pixel can be changed, and images having a large number of focuses or 3D images can be displayed.

SUMMARY OF THE INVENTION

It is considered that, by combining the HUD unit provided with the positive diffractive reflective element described in JP2020-56880A and the windshield in which the P-polarized light reflection film is incorporated, it is possible to obtain an HUD system having excellent vehicle mountability and excellent visibility of virtual image display (robustness of visibility is improved, double images are resolved, and suitability for polarizing sunglasses is obtained).

However, as a result of repeated studies by the present inventors, it has been found that in a case where the P-polarized light from the HUD unit including the positive diffractive reflective element is simply emitted to the windshield in which the P-polarized light reflection film is incorporated, the positive diffractive reflective element has a polarization dependence on the diffraction efficiency because of the fact that the period of the diffraction pattern is not uniform in the vertical direction and the horizontal direction, and thus there is a problem in that the brightness of a virtual image is reduced as compared with a case of using a general reflection mirror such as a concave mirror (magnifying glass).

In addition, in a case where the light field display described in JP2020-160296A is applied, the number of pixels used for displaying an image is significantly smaller than that of the image of a single focus, and thus the image becomes further dark. Therefore, there is a demand for a virtual image display apparatus that has a configuration in which the light loss in an optical path that guides image light is small and that can increase the brightness of a virtual image even in a HUD system that includes a light field display and displays a virtual image with multiple foci or in 3D.

An object of the present invention is to provide a virtual image display apparatus, a head-up display system, and a transportation machine provide therewith, the virtual image display apparatus including a positive diffractive reflective element and being configured such that P-polarized image display light is incident into a projection portion, in which brightness of virtual image display is improved, and the virtual image can be satisfactorily visually recognized even in a case where a polarizing sunglasses is worn.

The present inventors have conducted intensive studies in view of the above-described problems, and as a result, have found that the above-described problems can be solved by configuration in which light incident on a positive diffractive reflective element is to be linearly polarized light having a satisfactory diffraction efficiency and the reflected light after diffraction is to be P-polarized light in a case where the reflected light is incident into a projection portion, thereby completing the present invention.

That is, the object of the present invention has been achieved by the following means.

[1]

A virtual image display apparatus that is configured to be mounted in a transportation machine and is configured such that P-polarized image display light is incident into a projection portion, the virtual image display apparatus comprising an image display device that emits projection image light, a diffractive reflective element having positive optical power, and a half-wave plate having a front retardation of 200 nm to 400 nm, in which the diffractive reflective element and the half-wave plate are provided on an optical path that guides the projection image light to the projection portion, in order from a side of the image display device.

[2]

The virtual image display apparatus according to [1], further comprising a half-wave plate having a front retardation of 200 nm to 400 nm, which is provided between the diffractive reflective element having positive optical power and the image display device on the optical path.

[3]

The virtual image display apparatus according to [1] or [2], in which the diffractive reflective element having positive optical power is a reflective type hologram element that is obtained by fixing a photosensitive material and that has a refractive index distribution.

[4]

The virtual image display apparatus according to [1] or [2], in which the diffractive reflective element having positive optical power is a diffractive element that has an alignment film and a liquid crystal layer, that has a liquid crystal alignment pattern according to a periodic pattern of the alignment film, and that has a function of diffracting and reflecting incident light.

[5]

The virtual image display apparatus according to any one of [1] to [4], further comprising a transmission type optical element having negative optical power, which is provided between the diffractive reflective element having positive optical power and the image display device on the optical path.

[6]

The virtual image display apparatus according to [5], in which the transmission type optical element having negative optical power is a transmission type hologram element that is obtained by fixing a photosensitive material and that has a refractive index distribution.

[7]

The virtual image display apparatus according to [5], in which the transmission type optical element having negative optical power is a diffractive element that has an alignment film and a liquid crystal layer, that has a liquid crystal alignment pattern according to a periodic pattern of the alignment film, and that has a function of diffracting and transmitting incident light.

[8]

The virtual image display apparatus according to [5], in which the transmission type optical element having negative optical power is a lens that refracts the projection image light.

[9]

The virtual image display apparatus according to any one of [1] to [8], in which the image display device is a light field display.

[10]

A head-up display system comprising a windshield glass that has a first glass plate, a P-polarized light reflection film, and a second glass plate and the virtual image display apparatus according to any one of [1] to [9].

[11]

The head-up display system according to [10], in which the P-polarized light reflection film has a layer consisting of a cholesteric liquid crystal.

[12]

The head-up display system according to [10], in which the P-polarized light reflection film has a layer formed by laminating an optically anisotropic layer and an optically isotropic layer.

[13]

A transportation machine comprising the head-up display system according to any one of [10] to [12].

The virtual image display apparatus according to the present invention is a virtual image display apparatus including a positive diffractive reflective element and being configured such that P-polarized image display light is incident into a projection portion, in which brightness of virtual image display is improved, and the virtual image can be satisfactorily visually recognized even in a case where a polarizing sunglasses is worn. Therefore, in the head-up display system and the transportation machine using the virtual image display apparatus according to the present invention, brightness of virtual image display is improved, and the virtual image can be satisfactorily visually recognized even in a case where a polarizing sunglasses is worn.

DESCRIPTION OF THE PREFERRED EMBODIMENTS

Figure 1:
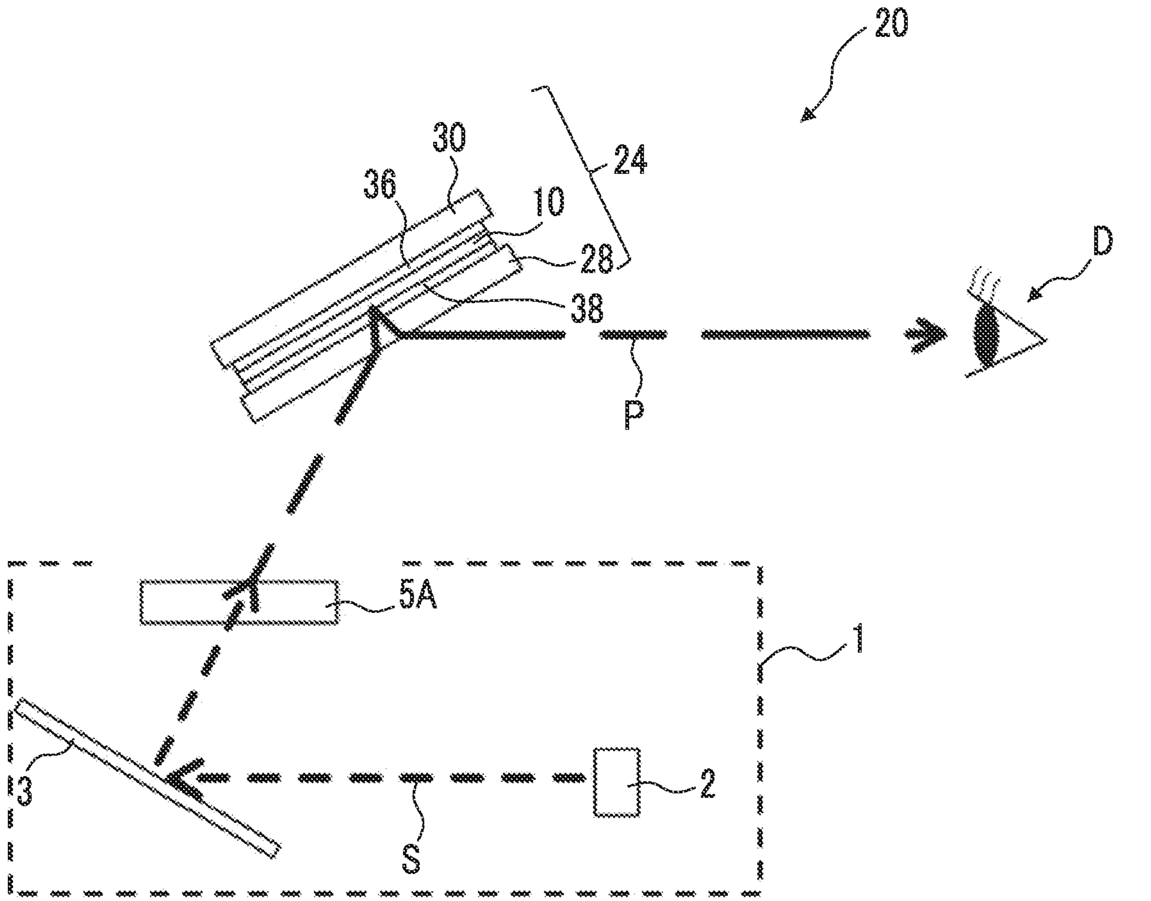
FIG. 1 is a schematic view schematically showing an example of an HUD system according to the present invention.

In the present invention, the expression “to” is used to mean that numerical values described before and after “to”

are included as a lower limit value and an upper limit value, respectively. For example, in a case where E1 is a numerical value al to a numerical value β1, the range ε1 is a range including the numerical value α1 and the numerical value β1, which is expressed by a mathematical symbol $\alpha 1 \leq \varepsilon 1 \leq \beta 1$.

In the present invention, regarding "angle" represented by a specific numerical value such as 60°, the terms "parallel" and "perpendicular" include an error range generally accepted in the technical field of the present invention unless otherwise specified. For example, an angle is in a range of the exact angle less than #10°, and the error from the exact angle is preferably 7° or less and more preferably 5° or less.

In the present invention, the term "sense" is used regarding circularly polarized light means either dextrorotatory circularly polarized light or levorotatory circularly polarized light. The sense of circularly polarized light is defined such that, in a case where light is viewed as it proceeds toward a viewer, the sense is dextrorotatory circularly polarized light in a case where the distal end of the electric field vector rotates clockwise as time increases, and the sense is levorotatory circularly polarized light in a case where it rotates counterclockwise.

In the present invention, the term "sense" may be used for the twisted direction of the helix of the cholesteric liquid crystal. In a case where a twisted direction (sense) of a helix of a cholesteric liquid crystal is the right direction, the cholesteric liquid crystal reflects dextrorotatory circularly polarized light and transmits levorotatory circularly polarized light, and in a case where the sense is the left direction, the cholesteric liquid crystal reflects levorotatory circularly polarized light and transmits dextrorotatory circularly polarized light.

In the present invention, in a case where the term "light" is simply referred to, the term "light" means light of visible light and natural light (non-polarized light), unless otherwise specified. The visible light means light at a wavelength which is visible to the human eyes and is light in a wavelength range of 380 to 780 nm, among electromagnetic waves. Invisible light refers to light in a wavelength range of less than 380 nm or more than 780 nm.

In addition, although not limited thereto, among visible light, light in a wavelength range of 420 to 490 nm is blue light (B light), light in a wavelength range of 495 to 570 nm is green light (G light), and light in a wavelength range of 620 to 750 nm is red light (R light). Furthermore, although not limited thereto, infrared light refers to invisible light in a wavelength range of more than 780 nm and 2,000 nm or less.

In the present invention, the term "visible light transmittance" is a visible light transmittance of an A light source defined in JIS (Japanese Industrial Standards) R 3212:2015 (Test methods of safety glazing materials for road vehicles). That is, the transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average. In addition, in a case of simply referring to "reflected light" or "transmitted light", the "reflected light" and "transmitted light" include meanings of scattered light and diffracted light.

In the present invention, "p-polarized light" represented by using a lower case p means polarized light that vibrates in a direction parallel to an incident surface of light. The incident surface means a surface that is perpendicular to a reflecting surface (such as a surface of windshield glass) and that includes incident rays and reflected rays. A vibrating surface of an electric field vector of the p-polarized light is parallel to the incident surface. On the other hand, the "s-polarized light" represented by using a lower case s means polarized light that vibrates in a direction perpendicular to an incident surface of light. A vibrating surface of an electric field vector of the p-polarized light is perpendicular to the incident surface.

In the present invention, unless otherwise specified, "P-polarized light" represented by using a capital letter P means linearly polarized light and polarized light in which the proportion of p-polarized light to s-polarized light and p-polarized light constituting reflected light is more than 50%. A proportion of the p-polarized light to the s-polarized light and the p-polarized light constituting the reflected light is preferably 60% or more, more preferably 80% or more, and still more preferably 90% or more. The upper limit value of the proportion of the p-polarized light to the s-polarized light and the p-polarized light constituting the reflected light is not limited and 100% or less is preferable.

Similarly, in the present invention, "S-polarized light" represented by using a capital letter S means linearly polarized light and polarized light in which the proportion of s-polarized light to s-polarized light and p-polarized light constituting reflected light is more than 50%. A proportion of the s-polarized light to the s-polarized light and the p-polarized light constituting the reflected light is preferably 60% or more, more preferably 80% or more, and still more preferably 90% or more. The upper limit value of the proportion of the s-polarized light to the s-polarized light and the p-polarized light constituting the reflected light is not limited and 100% or less is preferable.

In the present invention, the optical element having positive optical power means an element in which $1/f>0$ is satisfied in a case where f is a focal length, and examples thereof include an optical element that collects light, such as a concave mirror and a convex lens. The concave mirror collects reflected light, and the convex lens collects transmitted light. The diffractive reflective element having positive optical power means an optical element having positive optical power and having a diffraction and reflection function.

On the other hand, the optical element having negative optical power means an element in which $1/f<0$ is satisfied in a case where f is a focal length, and examples thereof include an optical element that diffuses light, such as a convex mirror and a concave lens. The convex mirror diffuses reflected light, and the concave lens diffuses transmitted light. The transmission type optical element having negative optical power means an optical element having negative optical power and having a light transmission function.

In the present invention, the front phase difference (front retardation) is a value measured using AxoScan manufactured by Axometrics, Inc. Unless otherwise specified, a measurement wavelength is set to 550 nm. Light that has wavelengths in a visible light wavelength range is allowed to be incident into the normal direction of a film and measured to obtain a value by using KOBRA 21ADH or WR (manufactured by Oji Scientific Instruments), and the value can also be used as the front phase difference. In a case of selecting a measurement wavelength, a wavelength selective filter can be manually exchanged, or a measurement value can be converted using a program or the like to perform the measurement.

In the present invention, the birefringence (Δn) of the liquid crystal compound is a value measured according to the method described on p. 214 of "Liquid Crystal, Basic edition (edited by OKANO Koji and KOBAYASHI Shunsuke)". Specifically, the liquid crystal compound is poured into a wedge-shaped cell and irradiated with light having a wavelength of 550 nm, and the refraction angle of the transmitted light is measured to obtain Δn at 60° C.

In the present invention, the optical isotropy in the "optically isotropic layer" means that birefringence is not exhibited. On the other hand, the optical anisotropy in the "optically anisotropic layer" means birefringence is exhibited, and in the optically anisotropic layer, as described later, the refractive index $n_{e1}$ in the in-plane slow axis direction and the refractive index $n_{o2}$ in the direction (in-plane fast axis direction) orthogonal to the in-plane slow axis direction have a relationship of $n_{e1}>n_{o2}$.

In the present invention, the term "projection image" means an image based on projection of light from an image display device to be used. In the virtual image display apparatus and the HUD system according to the embodiment of the present invention, the projection image is visually recognized by an observer as a virtual image that appears to float ahead of the projection portion of the windshield glass as viewed from the observer.

In the present invention, the term "screen image" means an image displayed on a drawing device of the virtual image display apparatus or an image drawn on an intermediate image screen or the like by the drawing device. Unlike a virtual image, the screen image is a real image.

Both the screen image and the projection image may be monochrome images, may be multicolor images with two or more colors, or may be full color images.

In addition, in the present invention, the term "liquid crystal compound" is used as including a state where liquid crystal properties are lost by curing reaction or the like.

The virtual image display apparatus and the HUD system according to the embodiment of the present invention is typically used by being mounted on a transportation machine of a vehicle such as an automobile and a train, an aircraft, and a ship.

Hereinafter, the virtual image display apparatus according to the embodiment of the present invention will be described in detail in the description of the suitable embodiment shown as an example in the accompanying drawings for the virtual image display apparatus according to the embodiment of the present invention and the head-up display system including the windshield glass. In the drawings, the dimensions and scale of each part may be different from actual dimensions and scale for convenience of description. In addition, the drawings may be schematically shown for easy understanding.

<<Head-Up Display System (HUD System)>>

The HUD system according to the embodiment of the present invention is an HUD system that has a windshield glass having a first glass plate, a P-polarized light reflection film, and a second glass plate, and the virtual image display apparatus according to the embodiment of the present invention.

The virtual image display apparatus according to the embodiment of the present invention is a virtual image display apparatus that is configured to be mounted in a transportation machine and is configured such that P-polarized image display light is incident into a projection portion.

The virtual image display apparatus has an image display device including a projection portion that emits projection image light and has a diffractive reflective element having positive optical power (hereinafter, also simply referred to as a "positive diffractive reflective element") and a half-wave plate having a front retardation of 200 nm to 400 nm (hereinafter, also simply referred to as a "half-wave plate") on an optical path that guides the projection image light to the projection portion, in order from a side of the image display device.

As described above, in a case where the virtual image display apparatus according to the embodiment of the present invention is configured to have the half-wave plate on the optical path from the positive diffractive reflective element to the projection portion, the incident light is to be S-polarized light having an excellent diffraction efficiency in the positive diffractive reflective element when the projection image light from the image display device is incident into the positive diffractive reflective element, a polarization state of the diffracted and reflected light from the positive diffractive reflective element can be converted from S-polarized light into P-polarized light by the half-wave plate, and the incident light can be P-polarized light when the incident light is incident into the projection portion. In a case where the diffraction and reflection of s-polarized light and p-polarized light in the positive diffractive reflective element are described in detail, since the vibrating surface of the electric field vector of p-polarized light is perpendicular to the diffraction pattern of the positive diffractive reflective element, the pitch interval in the diffraction pattern changes depending on the incidence angle, thereby the diffraction efficiency deteriorates. On the other hand, since the vibrating surface of the electric field vector of s-polarized light is parallel to the diffraction pattern of the positive diffractive reflective element, the pitch interval in the diffraction pattern does not substantially change depending on the incidence angle and the emission angle does not deviate from the design value even in a case where the incidence angle changes, thereby excellent diffraction efficiency is exhibited.

In the HUD system according to the embodiment of the present invention that has the virtual image display apparatus according to the embodiment of the present invention and the windshield glass having the P-polarized light reflection film in combination, as described above, the configuration is adopted in which the light loss in an optical path that guides projection image light is suppressed. Therefore, brightness of virtual image display is improved, and the virtual image can be satisfactorily visually recognized even in a case where a polarizing sunglasses is worn.

The virtual image display apparatus according to the embodiment of the present invention is configured to be mounted on a transportation machine, and is configured such that P-polarized image display light is incident into a projection portion. For example, in a vehicle, the virtual image display apparatus is configured to be mounted in the vehicle by being accommodated in an instrument panel or a dashboard of the vehicle, and disposed such that P-polarized image display light is incident on a windshield glass of the vehicle, which is a projection portion.

Figure 2:
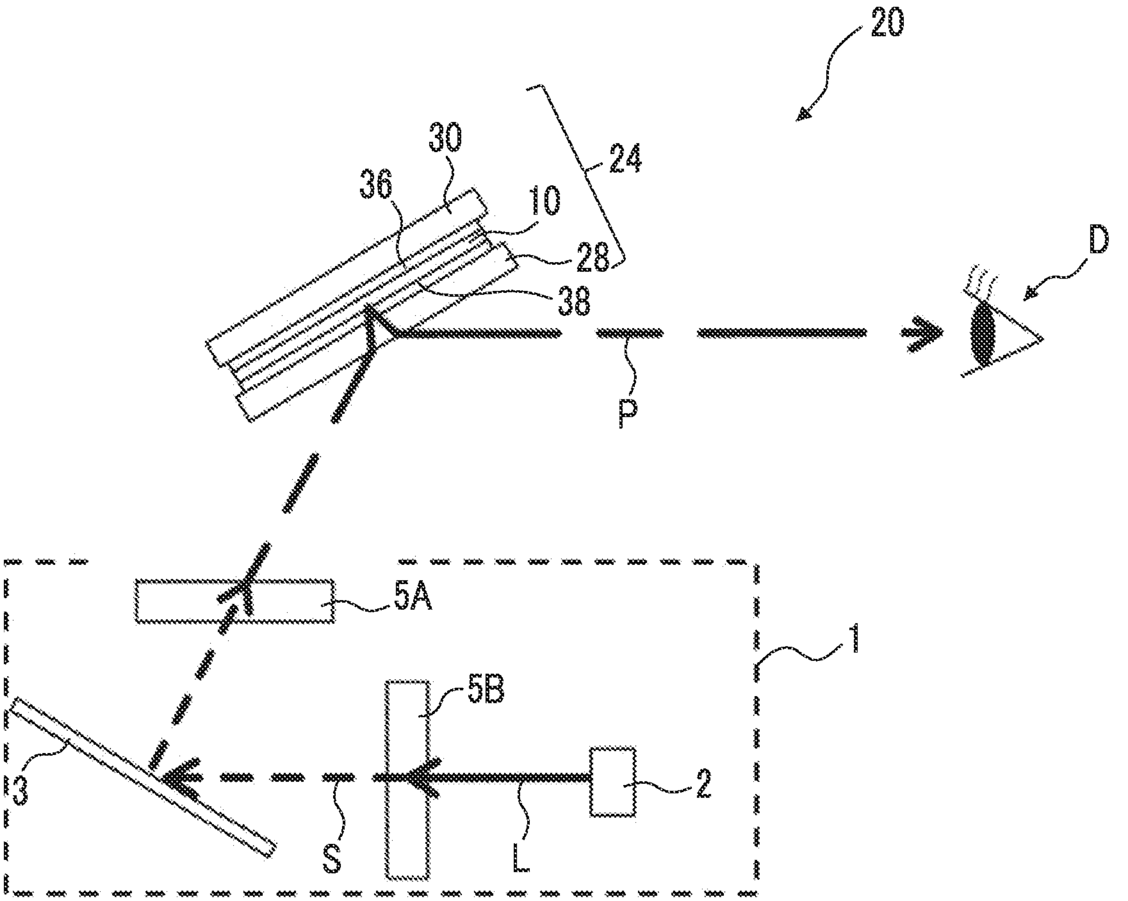
FIG. 2 is a schematic view schematically showing another example of an HUD system according to the present invention.
Figure 3:
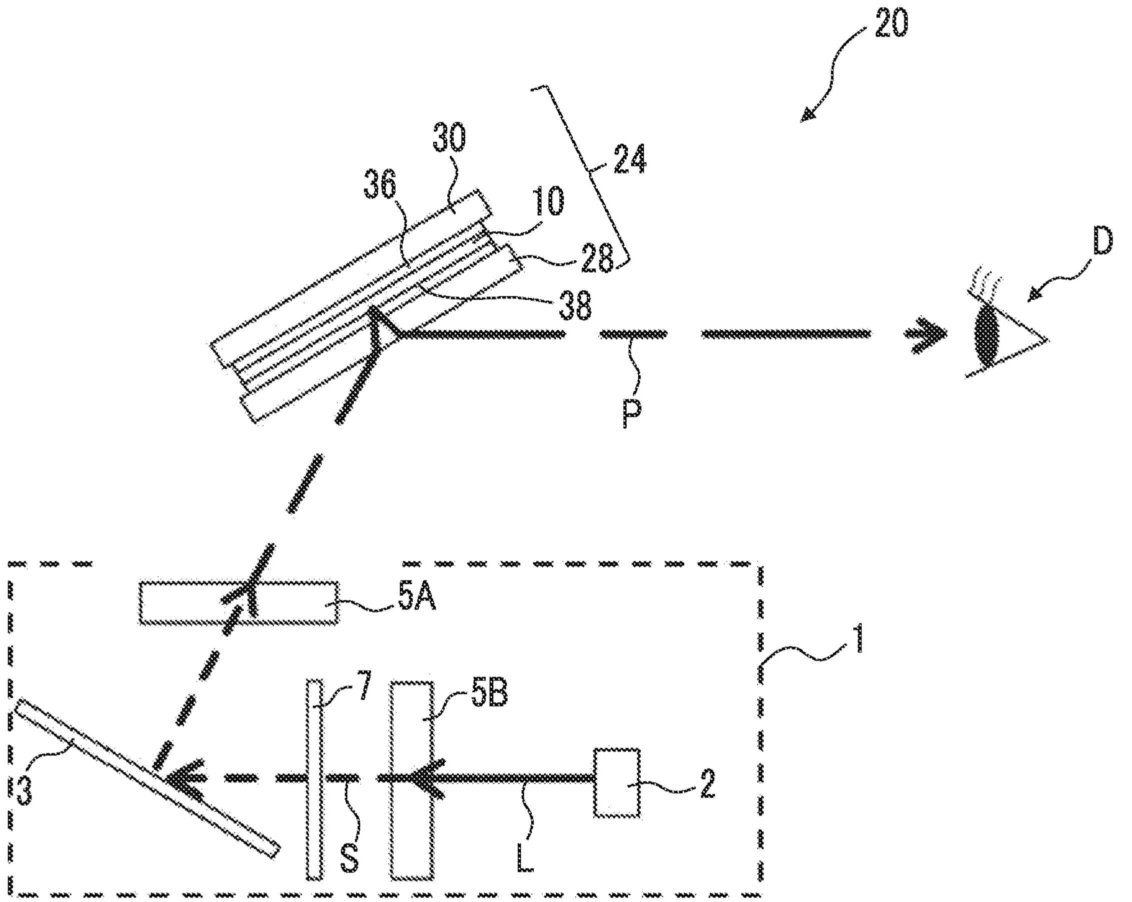
FIG. 3 is a schematic view schematically showing still another example of an HUD system according to the present invention.

FIGS. 1 to 3 show an example of the HUD system according to the embodiment of the present invention.

The HUD system 20 according to an embodiment of the present invention shown in FIGS. 1 to 3 includes a windshield glass 24 and a virtual image display apparatus 1.

The virtual image display apparatus 1 shown in FIG. 1 is configured to include an image display device 2, a positive diffractive reflective element 3, and a half-wave plate 5A.

The virtual image display apparatus 1 shown in FIG. 1 has a configuration in which an image display device 2, a positive diffractive reflective element 3, and a half-wave plate 5A are disposed in this order on an optical path that guides projection image light emitted from the image display device 2 to a windshield glass 24 which is a projection portion.

The virtual image display apparatus 1 shown in FIG. 2 has a configuration in which a half-wave plate 5B is disposed between the image display device 2 and the positive diffractive reflective element 3 on the optical path shown in the virtual image display apparatus 1 shown in FIG. 1. That is, the virtual image display apparatus 1 shown in FIG. 2 has a configuration in which the image display device 2, the half-wave plate 5B, the positive diffractive reflective element 3, and the half-wave plate 5A are disposed in this order on an optical path that guides the projection image light emitted from the image display device 2 to the windshield glass 24 which is a projection portion.

The virtual image display apparatus 1 shown in FIG. 3 has a configuration in which a negative transmission type optical element 7 is disposed between the half-wave plate 5B and the positive diffractive reflective element 3 on the optical path shown in the virtual image display apparatus 1 shown in FIG. 2. That is, the virtual image display apparatus 1 shown in FIG. 3 has a configuration in which the image display device 2, the half-wave plate 5B, the negative transmission type optical element 7, the positive diffractive reflective element 3, and the half-wave plate 5A are disposed in this order on an optical path that guides the projection image light emitted from the image display device 2 to the windshield glass 24 which is a projection portion.

S in FIGS. 1 to 3 represents S-polarized light, P in FIGS. 1 to 3 represents P-polarized light, and L in FIGS. 2 and 3 represents linearly polarized light, and these indicates the type of polarized light until projection image light emitted from the image display device 2 reaches the observer D.

The windshield glass 24 shown in FIGS. 1 to 3 is configured to have a first glass plate 30, a P-polarized light reflection film 10, and a second glass plate 28 in this order. The windshield glass 24 is disposed such that P-polarized image display light from the virtual image display apparatus 1 is incident on a side of the second glass plate 28, and the image projected to the windshield glass 24, which is the projection portion, by reflecting the P-polarized light in the P-polarized light reflection film 10 is observed by the observer D as a virtual image through the windshield glass 24.

Hereinafter, the virtual image display apparatus 1 and the windshield glass 24 will be described in order.

<Virtual Image Display Apparatus>

As shown in FIGS. 1 to 3, the virtual image display apparatus 1 has an image display device 2, a positive diffractive reflective element 3, and a half-wave plate 5A in this order on an optical path that guides projection image light emitted from the image display device 2 to a windshield glass 24 which is a projection portion.

[1] Positive Diffractive Reflective Element

The positive diffractive reflective element 3 is not particularly limited as long as it is an optical element that diffracts and reflects the projection image light emitted from the image display device 2, and a positive diffractive reflective element that is generally used can be used.

As described above, in the virtual image display apparatus 1 according to the embodiment of the present invention, on the optical path that guides the projection image light emitted from the image display device 2 to the windshield glass 24 which is a projection portion, by having the positive diffractive reflective element 3, the half-wave plate 5A, and the windshield glass 24 which is a projection portion in order from a side of the image display device 2, the light diffracted and reflected by the positive diffractive reflective element 3 can be S-polarized light having an excellent diffraction efficiency, the S-polarized light can be converted into P-polarized light by the half-wave plate 5A, and the reflected P-polarized light can be efficiently incident into the P-polarized light reflection film 10 of the windshield glass 24.

Examples of the positive diffractive reflective element 3 include a reflective type hologram element that is obtained by fixing a photosensitive material and that has a refractive index distribution (hereinafter, also simply referred to as a "positive reflective type hologram element"), and a diffractive element that has an alignment film and a liquid crystal layer, that has a liquid crystal alignment pattern according to a periodic pattern of the alignment film, and that has a function of diffracting and reflecting incident light (hereinafter, also simply referred to as a "positive reflective type liquid crystal diffraction element").

(Positive Reflective Type Hologram Element)

The positive reflective type hologram element has a refractive index distribution in which a high refractive index and a low refractive index are periodically distributed and functions as a positive diffractive reflective element.

As the positive reflective type hologram element, for example, as described in FIG. 3 of JP2020-56880A, a volume type hologram element that is formed in a thin plate shape, particularly in a flat plate shape by sandwiching a hologram layer between a pair of translucent substrate layers can be used. The periodic refractive index distribution in the hologram layer functions as a diffraction structure.

The pair of translucent substrate layers is formed in a thin plate shape having light transmittance, for example, by a synthetic resin, glass, or the like, and protect and reinforce the hologram layer.

The hologram layer is formed in a state where information on the amplitude and the phase of the object light is recorded in the hologram material as interference fringes with the reference light in advance. The interference fringe described herein is an interference fringe realized by the above-described periodic refractive index distribution. As the hologram material, a material in which information on an amplitude and a phase of object light can be recorded by spatially modulating a refractive index, such as a material mainly composed of a synthetic resin, a gelatin photosensitive material, or a silver salt photosensitive material, can be selectively adopted.

In the hologram layer of the positive reflective type hologram element, interference fringes that collect, and diffract and reflects display light are formed. For this diffraction, primary diffracted light having the highest diffraction efficiency is mainly used.

The positive reflective type hologram element does not have polarization properties with respect to light to be reflected and it is unpolarized light reflection.

A positive reflective type hologram element that realizes positive optical power using primary diffracted light realizes color dispersion in a direction opposite to a direction in normal dispersion exhibited by a convex refractive lens with respect to visible light. That is, the magnitude of the polarization angle due to diffraction by the positive reflective type hologram element works such that the magnitude of the polar angle due to diffraction by a ray on a long wavelength side is larger than that of a ray on a short wavelength side.

The positive reflective type hologram element can be produced by a usual method.

For example, with respect to the photosensitive material, laser light beam is separated into two laser light beams by a beam splitter, information on the amplitude and the phase of the object light is made as an interference pattern (periodic refractive index distribution) with the reference light using the two separated laser light beams, the photosensitive material is cured in a state where the refractive index distribution is made, and a volume type reflective hologram element can be produced.

The desired interference pattern can be produced by adjusting an irradiation direction of the laser light beam and/or an irradiation surface such that a hologram element exhibiting a desired diffraction and reflection can be obtained in accordance with the size of the windshield glass, the distance between the windshield glass and the virtual image display apparatus, the other optical members, and the like.

(Positive Reflective Type Liquid Crystal Diffraction Element)

The positive reflective type liquid crystal diffraction element is not particularly limited as long as the positive reflective type liquid crystal diffraction element has the alignment film and the liquid crystal layer, has the liquid crystal alignment pattern depending on the periodic pattern of the alignment film, and has a function of diffracting and reflecting incident light.

For example, the optical element described in WO2019/131966A can be preferably used as the positive reflective type liquid crystal diffraction element since the wavelength dependence of the reflection angle is small and red light, green light, and blue light incident from the same direction can be reflected in substantially the same direction.

The positive reflective type liquid crystal diffraction element has polarization properties with respect to light to be reflected and it is circularly polarized light reflection. Therefore, in a case of incorporating the positive reflective type liquid crystal diffraction element into the virtual image display apparatus 1 according to the embodiment of the present invention, the positive reflective type liquid crystal diffraction element is used as a positive diffractive reflective element that reflects linearly polarized light by bonding a quarter-wave plate onto the positive reflective type liquid crystal diffraction element and disposing such that the projection image light from the image display device 2 is incident on a side of the quarter-wave plate.

The positive reflective type liquid crystal diffraction element can be produced by a usual method.

For example, a reflective type liquid crystal diffraction element can be produced by forming an alignment film on an undercoat layer formed on a support, irradiating the alignment film with laser light beam, controlling an interference pattern (surface periodic structure) by changing an intersecting angle between two laser light beams, curing the alignment film, and forming a cholesteric liquid crystal layer on the obtained photo-alignment film. For example, a production method of an optical element described in WO2019/131966A can be referred to.

[2] Half-Wave Plate

As shown in FIGS. 1 to 3, in the virtual image display apparatus 1 according to the embodiment of the present invention, the half-wave plate 5A is provided to be positioned between the positive diffractive reflective element 3 and the windshield glass 24, which is the projection portion, on the optical path that guides the projection image light emitted from the image display device 2 to the windshield glass 24 which is the projection portion.

In addition, as shown in FIGS. 2 and 3, the virtual image display apparatus 1 according to the embodiment of the present invention may further have a half-wave plate 5B between the positive diffractive reflective element 3 and the image display device 2 on the optical path, in addition to the half-wave plate 5A.

Any one of the above-described half-wave plates 5A and 5B can be appropriately used depending on the purpose without particular limitation as long as it is a half-wave plate in which the front retardation at a wavelength of 550 nm measured by the above-described method is 200 nm to 400 nm.

As described above, in the virtual image display apparatus 1 according to the embodiment of the present invention, by providing the half-wave plate 5A between the positive diffractive reflective element 3 and the windshield glass 24 which is the projection portion on the optical path that guides the projection image light emitted from the image display device 2 to the windshield glass 24 which is the projection portion, S-polarized light diffracted and reflected with high diffraction efficiency in the positive diffractive reflective element 3 can be converted into P-polarized light that is efficiently reflected in the P-polarized light reflection film 10 of the windshield glass 24.

In addition, as shown in FIGS. 2 and 3, in a case where the virtual image display apparatus 1 according to the embodiment of the present invention has the half-wave plate 5B between the positive diffractive reflective element 3 and the image display device 2 on the optical path, the projection image light emitted from the image display device 2 can be converted into S-polarized light that is diffracted and reflected with satisfactory diffraction efficiency by the positive diffractive reflective element 3. Therefore, a configuration in which the light loss in the optical path that guides the projection image light is further suppressed is achieved, and the brightness of the virtual image display and the visibility in case of where the polarizing sunglasses are worn can be further improved.

Examples of the half-wave plates 5A and 5B include a stretched polycarbonate film, a stretched norbornene-based polymer film, a transparent film in which inorganic particles having birefringence such as strontium carbonate are included and aligned, a thin film in which oblique deposition of an inorganic dielectric is performed on a support, a film in which the polymerizable liquid crystal compound is uniaxially aligned and the alignment is immobilized, a film in which the liquid crystal compound is uniaxially aligned and the alignment is immobilized, and the like.

Among these, the half-wave plates 5A and 5B is suitably a film obtained by uniaxially aligning and immobilizing a polymerizable liquid crystal compound.

As an example, such half-wave plates 5A and 5B can be formed in the following order. A liquid crystal composition including a polymerizable liquid crystal compound is applied on a transparent substrate, a temporary support or the surface of the alignment layer, the polymerizable liquid crystal compound in the liquid crystal composition is formed in a nematic alignment in a liquid crystal state, and then the polymerizable liquid crystal compound is immobilized by curing to form the retardation layer.

In this case, the formation of the half-wave plates 5A and 5B can be carried out in the same manner as the formation of the cholesteric liquid crystal layer described later, except that no chiral agent is added to the liquid crystal composition. However, during the formation of the nematic alignment after applying the liquid crystal composition, the heating temperature is preferably 50° C. to 120° C., and more preferably 60° C. to 100° C.

The half-wave plates 5A and 5B may be a layer formed by applying a composition including a polymer liquid crystal compound on the transparent substrate, the temporary support, the surface of the alignment layer or the like, forming the nematic alignment in a liquid crystal state, cooling the composition, and then obtained by immobilizing the alignment.

The half-wave plates 5A and 5B may be formed by bonding two quarter-wave plates using a high transparent adhesive transfer tape (OCA tape).

The quarter-wave plate is not particularly limited as long as the half-wave plates 5A and 5B can be obtained, and for example, a quarter-wave plate having a front retardation of 100 nm to 200 nm is preferable.

The thicknesses of the half-wave plates 5A and 5B are not limited, and are preferably 0.2 to 300 μm, more preferably 0.5 to 150 μm, and still more preferably 1.0 to 80 μm. In addition, the thicknesses of the half-wave plates 5A and 5B formed from the liquid crystal composition are not particularly limited, and are preferably 0.2 to 10 μm, more preferably 0.5 to 5.0 μm, and still more preferably 0.7 to 2.0 μm.

The half-wave plates 5A and 5B are rotated and disposed such that the slow axis directions of the half-wave plates 5A and 5B are matched such that transmitted light is desired polarized light in a case of being incorporated into the HUD system 20.

Specifically, as shown in FIGS. 1 to 3, the half-wave plate 5A is disposed such that transmitted light, that is, light incident on the windshield glass 24 is P-polarized light.

On the other hand, as shown in FIGS. 2 and 3, the half-wave plate 5B is disposed such that transmitted light, that is, light incident into the positive diffractive reflective element 3 is S-polarized light. The half-wave plate 5B is disposed such that in the virtual image display apparatus 1 shown in FIG. 2, S-polarized light as transmitted light through the half-wave plate 5B is directly incident into the positive diffractive reflective element 3, and in the virtual image display apparatus 1 shown in FIG. 3, S-polarized light as transmitted light through the half-wave plate 5B is transmitted through the negative transmission type optical element 7 as S-polarized light and is incident into the positive diffractive reflective element 3.

In addition, in a case where the P-polarized light reflection film 10 has a layer consisting of a cholesteric liquid crystal (also referred to as a "cholesteric liquid crystal layer"), and/or in a case where the positive diffractive reflective element 3 is a positive reflective type liquid crystal diffraction element, the disposition of the half-wave plate 5B is preferably determined according to the sense of the helix of the cholesteric liquid crystal layer.

The directions of the slow axes of the half-wave plates 5A and 5B can be set by, for example, rubbing treatment of the alignment film as an underlayer in a case where the half-wave plates 5A and 5B are formed of cholesteric liquid crystal layers.

[3] Negative Transmission Type Optical Element

The virtual image display apparatus according to the embodiment of the present invention may have a transmission type optical element having negative optical power (simply referred to as a "negative transmission type optical element") between the positive diffractive reflective element and the image display device on the optical path.

A case where the virtual image display apparatus according to the embodiment of the present invention has a negative transmission type optical element between the positive diffractive reflective element and the image display device on the optical path is preferable since the chromatic aberration can be improved by a combination of the positive diffractive reflective element that collects light and the negative transmission type optical element that diffuses light. That is, since the directions of the color shift generated by the difference in the polarization angle due to the diffraction are opposite to each other between the positive diffractive reflective element and the negative transmission type optical element, the color shift can be offset and the chromatic aberration can be reduced by making the value represented by the following mathematical expression 1 closer to 0.

$$1/(v_1 \cdot f_1) + 1/(v_2 \cdot f_2) \qquad \text{(Mathematical expression 1)}$$

In the above-described mathematical expression, the optical power of the positive diffractive reflective element is $1/f_2$, the color dispersion coefficient thereof is $v_2$, the optical power of the negative transmission type optical element is $1/f_1$, and the color dispersion coefficient thereof is $v_1$.

The embodiment in which the virtual image display apparatus according to the embodiment of the present invention has the negative transmission type optical element is not particularly limited as long as the negative transmission type optical element is disposed between the positive diffractive reflective element and the image display device on an optical path that guides projection image light to the projection portion.

For example, as shown in FIG. 3, the negative transmission type optical element 7 can be disposed between the image display device 2 and the positive diffractive reflective element 3 and between the half-wave plate 5B and the positive diffractive reflective element 3. In addition, in the virtual image display apparatus 1 in FIG. 2, a configuration may be adopted in which the negative transmission type optical element 7 is disposed between the image display device 2 and the positive diffractive reflective element 3 and between the image display device 2 and the half-wave plate 5B. In addition, in the virtual image display apparatus 1 in FIG. 1, a configuration may be adopted in which the negative transmission type optical element 7 is disposed between the image display device 2 and the positive diffractive reflective element 3.

From a viewpoint of further improving the diffraction efficiency, as shown in FIG. 3, the negative transmission type optical element 7 is preferably disposed such that the half-wave plate 5B is positioned between the image display device 2 and the negative transmission type optical element 7.

The negative transmission type optical element 7 is not particularly limited as long as it is an optical element that has negative optical power and transmits the projection image light emitted from the image display device 2, and a negative transmission type optical element that is generally used can be used.

Examples of the negative transmission type optical element 7 include a transmission type hologram element that is obtained by fixing a photosensitive material and that has a refractive index distribution (hereinafter, also simply referred to as a "negative transmission type hologram element"), a diffractive element that has an alignment film and a liquid crystal layer, that has a liquid crystal alignment pattern according to a periodic pattern of the alignment film, and that has a function of diffracting and transmitting incident light (hereinafter, also simply referred to as a "negative transmission type liquid crystal diffraction element"), and a lens that refracts the projection image light (hereinafter, also simply referred to as a "negative transmission type refractive lens").

(Negative Transmission Type Hologram Element)

The negative transmission type hologram element has a refractive index distribution in which a high refractive index and a low refractive index are periodically distributed, and functions as a negative diffractive transmissive element.

The description regarding the above-described positive reflective type hologram element can be applied to the negative transmission type hologram element, except that the optical power is adjusted to be negative (1/f<0) instead of positive (1/f>0) in the positive reflective type hologram element. In addition, the description regarding the production method of the positive reflective type hologram element can be applied to the production method of the negative transmission type hologram element, except that the optical power is adjusted to be negative instead of positive.

In the hologram layer of the negative transmission type hologram element, interference fringes that transmit display light and diffuses the display light by diffraction, are formed. For this diffraction, primary diffracted light having the highest diffraction efficiency is mainly used.

A negative transmission type hologram element that realizes negative optical power using primary diffracted light realizes color dispersion in a direction opposite to a direction in normal dispersion exhibited by a concave refractive lens with respect to visible light. That is, the magnitude of the polarization angle due to diffraction by the negative transmission type hologram element works such that the magnitude of the polarization angle due to diffraction by a ray on a long wavelength side is larger than that of a ray on a short wavelength side.

(Negative Transmission Type Liquid Crystal Diffraction Element)

The negative transmission type liquid crystal diffraction element is not particularly limited as long as the negative reflective type liquid crystal diffraction element has the alignment film and the liquid crystal layer, has the liquid crystal alignment pattern depending on the periodic pattern of the alignment film, and has a function of diffracting and transmitting incident light.

The description regarding the above-described positive reflective type liquid crystal diffraction element can be applied to the negative transmission type liquid crystal diffraction element, except that the chiral agent is not blended such that the liquid crystal layer is not cholesterically aligned such that the optical power is negative instead of positive in the positive reflective type liquid crystal diffraction element.

The description regarding the production of the above-described positive reflective type liquid crystal diffraction element can also be applied to a production method of the negative transmission type liquid crystal diffraction element, except that the chiral agent is not blended such that the liquid crystal layer is not cholesterically aligned in a case of forming the liquid crystal layer in the above-described production method of the positive reflective liquid crystal diffraction element. For example, a production method of an optical element described in WO2020/56880A can be referred to.

In addition, the negative transmission type liquid crystal diffraction element can be produced by adjusting the intersecting angle of the laser light beam to be small at the center portion of the element and to be large at the end portion of the element to obtain a negative transmission type liquid crystal diffraction element exhibiting desired properties, in accordance with the size of the windshield glass, the distance between the windshield glass and the virtual image display apparatus, the other optical members, and the like.

(Negative Transmission Type Refractive Lens)

The negative transmission type refractive lens is different from the above-described negative diffractive type optical element, and is, for example, a lens that is formed of a synthetic resin or glass exhibiting normal dispersion with respect to visible light to have light transmittance and that transmits display light while refracting the display light on a surface thereof.

The negative transmission type refractive lens has negative optical power and is a concave lens that diffuses display light by refraction. As the negative transmission type refractive lens that is the concave lens, a biconcave lens, a plano-concave lens, or a concave meniscus lens can be employed.

The negative transmission type refractive lens can be produced by adjusting to exhibit desired optical properties in accordance with the size of the windshield glass, the distance between the windshield glass and the virtual image display apparatus, the other optical members, and the like, by a usual method.

[4] Image Display Device

The image display device 2 is an image display device that emits projection image light (hereinafter, also referred to as "projection light"), the image display device including a "device that projects a drawn image", and emitting projection light that carries an image to be displayed.

In the virtual image display apparatus 1 according to the embodiment of the present invention, as the projection image light emitted from the image display device 2, it is enough for S polarized light just to be incident into the positive diffractive reflective element 3, and linearly polarized light is preferable.

In the virtual image display apparatus 1 shown in FIG. 1, since the half-wave plate 5B is not provided, it is preferable that the projection image light emitted from the image display device 2 is S-polarized light. In the virtual image display apparatus 1 shown in FIGS. 2 and 3, since the half-wave plate 5B is provided, the projection image light emitted from the image display device 2 may be linearly polarized light such that light incident into the positive diffractive reflective element 3 is S-polarized light.

In the present invention, an image display device that emits, as projection light, not only the S-polarized light but also linearly polarized light having an azimuthal angle rotated with respect to the S-polarized light by more than 0° to about 10°, can be preferably used. The azimuthal angle means an angle for rotating the vibration axis in a plane including the vibration axes of the S-polarized light and the P-polarized light. That is, the linearly polarized light having an azimuthal angle rotated with respect to the S-polarized light by more than 0° to about 10° means linearly polarized light having a vibration axis rotated with respect to a vibration axis of the S-polarized light by −10° to 10°.

In the virtual image display apparatus 1, the image display device 2 may be disposed to allow S polarized light to be incident into the positive diffractive reflective element 3.

In the HUD system 20, it is preferable that the image display device 2 includes a drawing device and reflects and displays an image (real image) drawn on a small-sized intermediate image screen as a virtual image by a combiner.

As the image display device 2, a generally used image display device for a HUD system can be used as long as the projection light of linearly polarized light can be emitted.

It is preferable that the virtual image display apparatus 1 according to the embodiment of the present invention has a variable image formation distance of a virtual image, that is, a variable image formation position of the virtual image.

Examples of a method of changing an image formation distance of a virtual image in the virtual image display apparatus include a method in which a surface (screen) on which a screen image is generated is moved (see JP2017-21302A), a method in which a plurality of optical paths having different optical path lengths are changed (see WO2015/190157A), a method in which the optical path length is changed by inserting and/or moving mirrors, a method in which the focal length is changed by using an assembled lens as an image formation lens, a method in which an image display device is moved, a method in which a plurality of virtual image display apparatuses having different image formation distances of virtual images are changed and used, and a method in which a variable-focal-length lens is used (see WO2010/116912A).

The virtual image display apparatus may be an apparatus in which the image formation distance of the virtual image can be continuously changed or may be an apparatus in which the image formation distance of the virtual image can be switched at two or three or more points.

Here, it is preferable that, among the virtual images of the projection light by the virtual image display apparatus, at least two virtual images have different image formation distances of 1 m or more. Therefore, in a case where the virtual image display apparatus is an apparatus in which the image formation distance of the virtual image can be continuously changed, it is preferable that the image formation distance of the virtual image can be changed by 1 m or more. Such a virtual image display apparatus is preferably used because the projector can suitably handle the case where the distance of visual line of the driver is considerably different between a normal speed run on the general road and a high speed run on the expressway.

In the virtual image display apparatus 1 according to the embodiment of the present invention, a light field display can be used as the image display device 2.

The light field display means an image display device having light emitting pixels and microlenses, in which the microlenses are formed on the light emitting pixels. As described above, in the light field display, an image with multiple foci and/or in 3D can be displayed since the focal point of each light emitting pixel can be changed, however, the brightness of the image is reduced since the number of pixels used for image display is significantly smaller than that of an image of a single focus. On the other hand, in the virtual image display apparatus according to the embodiment of the present invention, since the configuration is adopted in which the light loss in the optical path that guides the projection image light is suppressed, it is possible to improve the brightness of the virtual image display and the visibility in a case where the polarizing sunglasses are worn.

As the light field display, a light field display that is generally used can be used without particular limitation, and examples thereof include the light field display described in JP2020-160296A.

(Drawing Device)

The drawing device may itself be a device displaying a screen image or a device emitting light capable of drawing a screen image.

In the drawing device, light from the light source may be adjusted by a drawing method such as an optical modulator, laser brightness modulation unit, optical deflection unit for drawing, or the like. The drawing device includes a light source, and means a device including an optical modulator, laser brightness modulation unit, optical deflection unit for drawing, or the like according to the drawing method.

(Light Source)

A light source constituting the image display device 2 is not particularly limited, and a generally used light source used in an image display device, a drawing device, a display, and the like, such as a light emitting diode (LED), an organic light emitting diode (OLED), a discharge tube, and a laser light source, can be used.

Among these, LEDs and discharge tubes are preferred since they are suitable for a light source of a drawing device that emits linearly polarized light, and LEDs are particularly preferred. As the luminescence wavelength is not continuous in the visible light range, LEDs are suitable for combination with a combiner in which a cholesteric liquid crystal layer exhibiting selective reflection in a specific wavelength range is used as described later.

(Drawing Method)

The drawing method can be selected according to the laser light source and is not particularly limited.

Examples of the drawing method include a method using a fluorescent display tube, a liquid crystal display (LCD) method and a liquid crystal on silicon (LCOS) method, which use liquid crystal, a digital light processing (DLP) method (registered trademark), a scanning method using, for example, a laser, and the like.

The drawing method may be a method using a fluorescent display tube integrated with a light source. The LCD method is preferred as the drawing method.

In the LCD method and the LCOS method, light beams having respective colors are modulated and multiplexed by the optical modulator, and a light beam is emitted from a projection lens.

The DLP method is a display system using a digital micromirror device (DMD), in which micromirrors corresponding to the number of pixels are arranged, the drawing is performed and light is emitted from the projection lens.

The scanning method is a method of scanning a screen with light rays and imaging using an afterimage in eyes. For example, the description of JP1995-270711A (JP-H7-270711A) and JP2013-228674A can also be referred to. In the scanning method using the laser, a luminance modulated laser light beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser light beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical systems (MEMS), and among these, MEMS is preferable. The scanning method includes a random scan method, a raster scan method, or the like, and a raster scan method is preferably used. In the raster scan method, the laser light beam can be driven, for example, with a resonance frequency in a horizontal direction and with a saw-tooth wave in a vertical direction. Since the scanning method does not require the projection lens, it is easy to miniaturize the device.

As described above, the emitted light from the drawing device may be adjusted for S-polarized light to be incident into the positive diffractive reflective element 3, and is preferably linearly polarized light.

In a drawing device using a drawing method of the LCD method or the LCOS method and a drawing device using a laser light source, light emitted from the drawing device is essentially linearly polarized light. In the case where a drawing device in which the emitted light is linearly polarized light and includes light beams having a plurality of wavelengths (colors), the polarization directions (transmission axis directions) of light in a plurality of wavelengths are preferably the same as each other. Known commercially available drawing devices include a device that has non-uniform polarization directions in wavelength ranges of red light, green light, and blue light included in the emitted light (see JP2000-221449A). Specifically, an example is known that the polarization direction of the green light is orthogonal to the polarization direction of the red light and the polarization direction of the blue light.

In the HUD system 20 according to the embodiment of the present invention, the projection light emitted from the virtual image display apparatus 1 is P-polarized light.

(Intermediate Image Screen)

As described above, the drawing device may use an intermediate image screen. The "intermediate image screen" is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarized light incident on the intermediate image screen are in disorder, and color unevenness or the like is likely to occur in the combiner (P-polarized light reflection film 10). However, by using a phase difference film having a predetermined phase difference, the problem of occurrence of color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD system is described in, for example, JP2012-226303A, JP2010-145745A, and JP2007-523369A. The projector may include a reflecting mirror which adjusts an optical path of projection light formed by the drawing device.

Regarding HUD systems using the windshield glass as the reflection film, JP1990-141720A (JP-H02-141720A), JP1998-96874A (JP-H10-96874A), JP2003-98470A, U.S. Pat. No. 5,013,134A, and JP2006-512622A can be referred to.

The windshield glass is particularly effective for the HUD system used in combination with an image display device using lasers, LEDs, or organic light-emitting diodes (OLEDs) in which a luminescence wavelength is not continuous in a visible light range as a light source. This is because, the selective reflection center wavelength of the cholesteric liquid crystal layer can be adjusted in accordance with each luminescence wavelength. In addition, the windshield glass can also be used for projection of a display such as a liquid crystal display device (LCD) in which display light is polarized light.

[Projection Light (Incident Light)]

It is preferable that the incident light from the virtual image display apparatus 1 according to the embodiment of the present invention to the windshield glass 24 is incident at an oblique incidence angle of 45° to 70° with respect to the normal line of the P-polarized light reflection film 10. The Brewster's angle at an interface between the glass having a refractive index of approximately 1.51 and the air having a refractive index of 1 is approximately 56°, and the P-polarized light is allowed to incident in the range of the angle; thereby, an image display with the small amount of the reflected light of the incident light for the projection image display, which is reflected from the surface of the windshield glass 24 on the visible side with respect to the selective reflection layer contained in the P-polarized light reflection film 10, and a decreased effect of a double image can be achieved.

The above-described angle is also preferably set to 50° to 65°. At this time, it is preferable to employ a configuration in which an observation of the projection image can be performed at an angle of 45° to 70°, preferably 50° to 65° on a side opposite to a side on which light is incident, with respect to the normal line of the selective reflection layer contained in the P-polarized light reflection film 10 in the side on which projection light is incident.

The incident light may be incident from any direction of upwards, downwards, rightwards, and leftwards of the windshield glass 24, and may be determined in accordance with a visible direction. For example, the incident light is preferably incident at an obliquely incidence angle from the bottom during the use.

In the present invention, the P-polarized light reflection film 10 in the windshield glass 24 is disposed to reflect incident p-polarized light.

As described above, in the HUD system 20 according to the embodiment of the present invention, the image display light (projection light) emitted from the virtual image display apparatus 1 according to the embodiment of the present invention and incident into the projection portion is P-polarized light.

As described above, in a case where the virtual image display apparatus 1 is used whose polarization direction is not uniform in the wavelength ranges of red light, green light, and blue light of the emitted light, the polarization direction is preferably adjusted in a wavelength selective manner, and light is incident in all color wavelength ranges as P-polarized light.

As described above, the HUD system 20 may be a projection system in which a virtual image formation position is variable. The variable image formation position of the virtual image enables the driver to visually confirm the virtual image more comfortably and conveniently.

The image formation position of the virtual image is a position at which the driver of the vehicle can visually confirm a virtual image, and for example, typically, a position positioned 1000 mm or more away from the front of the windshield glass as seen by a driver.

In FIGS. 1 to 3, the vertical direction Y of the windshield glass 24 means a major axis direction of the windshield glass 24 on the paper plane. The vertical direction is a direction corresponding to the vertical direction of a vehicle or the like in which the windshield glass 24 is placed, and the direction is defined such that the ground side is a lower side and a side opposite to the lower side is an upper side. In the case where the windshield glass 24 is placed in the vehicle or the like, the windshield glass 24 may be arranged in an inclined manner for the sake of convenience of structure or design, and in this case, the vertical direction Y corresponds to a direction along a surface of the windshield glass 24. The surface is the outer surface side of the vehicle.

In the HUD system 20, the virtual image display apparatus 1 emits the projection light of P-polarized light to the second glass plate 28 in the windshield glass 24. In a case where the projection light is emitted from the virtual image display apparatus 1 to the windshield glass 24 is P-polarized light, thereby the reflection of the projection light by the first glass plate 30 and second glass plate 28 of the windshield glass 24 can be significantly reduced, and disadvantages that a double image is observed, and the like can be suppressed.

Preferably, the virtual image display apparatus 1 emits the projection light of the P-polarized light to the windshield glass 24 at a Brewster's angle. Therefore, the reflection of the projection light by the first glass plate 30 and the second glass plate 28 is eliminated, which allows display of a clearer screen image.

<Windshield Glass>

In FIGS. 1 to 3, a windshield glass 24 is a windshield glass having a first glass plate 30, a P-polarized light reflection film 10, and a second glass plate 28 in this order.

The term "windshield glass" means windows and windscreen glass for common vehicles such as cars and trains, airplanes, ships, motorcycles, and vehicles such as playground equipment. The windshield glass is preferably used as a windshield, a windscreen glass, or the like in a forward vehicle in a traveling direction.

Figure 4:
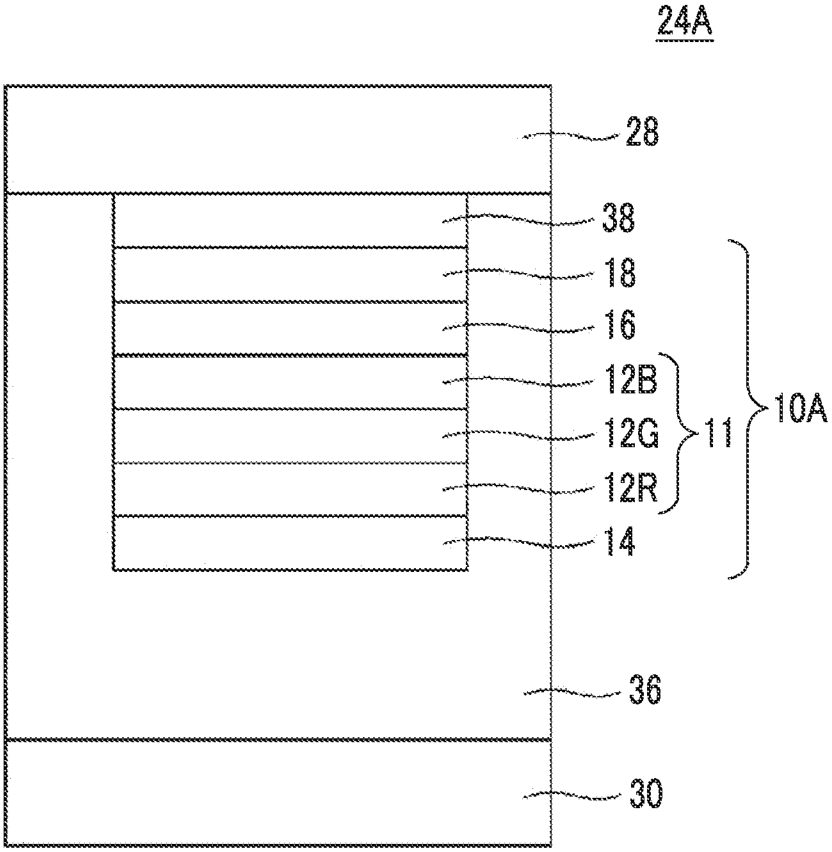
FIG. 4 is a schematic view showing a configuration example of a windshield glass used in the HUD system according to the embodiment of the present invention, the windshield glass having a P-polarized light reflection film that includes a layer consisting of a cholesteric liquid crystal.

A windshield glass 24A shown in FIG. 4 includes a second glass plate 28, a heat seal layer 38, the P-polarized light reflection film 10A, an interlayer film 36, and a first glass plate 30, in this order.

In FIG. 4, in the P-polarized light reflection film 10A, the polarization conversion layer 14 is arranged on a side of the first glass plate 30, and the retardation layer 16 (transparent substrate 18) is arranged on a side of the second glass plate 28 side.

Figure 5:
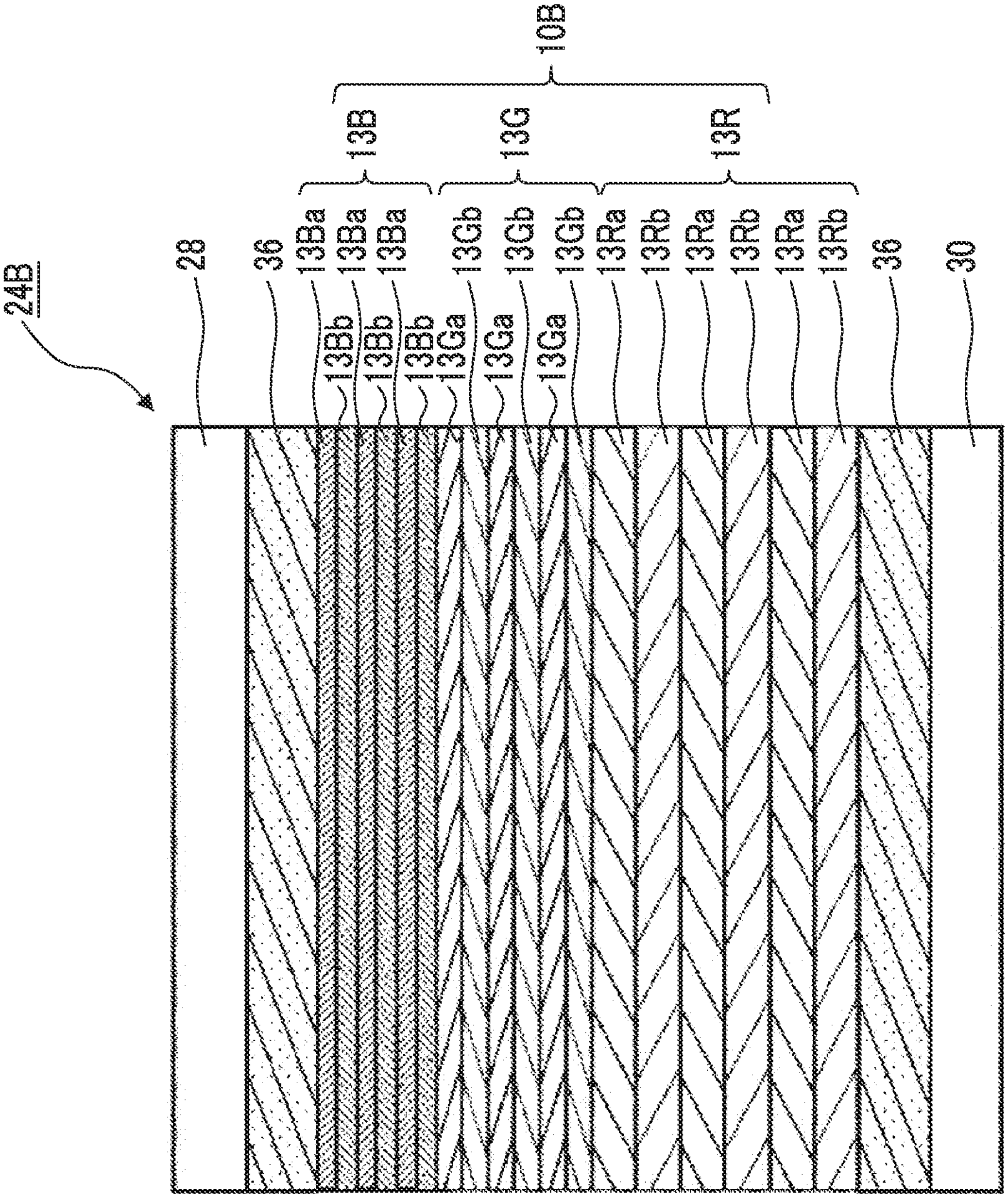
FIG. 5 is a schematic cross-sectional view showing a configuration example of a windshield glass used in the HUD system of the present invention, the windshield glass including a P-polarized light reflection film consisting of a dielectric multi-layer film.

A windshield glass 24B shown in FIG. 5 includes a second glass plate 28, an interlayer film 36, the P-polarized light reflection film 10B, an interlayer film 36, and a first glass plate 30, in this order.

In a case where the windshield glass is used in a vehicle, curved glass is often used as the second glass plate 28 and the first glass plate 30. In a case where the second glass plate 28 is positioned inside the vehicle and the first glass plate 30 is positioned outside the vehicle, a convex side of the second glass plate 28 is arranged to face the first glass plate 30, and a concave side of the first glass plate 30 is arranged to face the second glass plate 28.

In a case where each of the second glass plate 28 and the first glass plate 30 is curved glass, in the example shown in FIG. 4, the polarization conversion layer 14 and the selective reflection layer 11 are arranged in this order from the concave side of the first glass plate 30 toward the side of the second glass plate 28. The retardation layer 16 is arranged between the selective reflection layer 11 and the second glass plate 28.

From the viewpoint of the legal regulation, a visible light transmittance of the windshield glass is preferably 70% or more, more preferably more than 70%, even more preferably 75% or more, and particularly preferably 80% or more.

The above-described visible light transmittance is preferably satisfied at any position of the windshield glass, and particularly, the above-described visible light transmittance is preferably satisfied at a position where the P-polarized light reflection film is present. As described later, the P-polarized light reflection film can have high visible light transmittance, and a configuration in which the above-described visible light transmittance is satisfied can be achieved even in a case where any glass widely used for the windshield glass is used.

The shape of the windshield glass is not limited, and is appropriately determined according to a target on which the windshield glass is arranged. The windshield glass may be, for example, a flat surface or a three-dimensional shape having a curved surface such as a concave or a convex. In the windshield glass molded for an applicable vehicle, the upward direction during normal use, and surfaces becoming the observer side, the driver side, and the visible side such as the inside of the vehicle can be specified.

In the windshield glass, the P-polarized light reflection film may be provided at a projection image display portion (projection image reflection portion) of the windshield glass.

The windshield glass 24 used in the HUD system 20 according to the embodiment of the present invention has a laminated glass structure, and the P-polarized light reflection film 10 is protected by being provided between two glasses (the first glass plate 30 and the second glass plate 28) constituting the laminated glass.

The windshield glass 24 having a configuration in which the P-polarized light reflection film 10 is provided on the outer surface of the laminated glass constituting the windshield glass may be used. In this case, the P-polarized light reflection film 10 may be provided on the inside (the incident side of the projection image) of a vehicle or the like or may be provided on the outside thereof, but preferably provided on the inside.

As described above, the P-polarized light reflection film 10 is a member for displaying a projection image by reflecting the projection image. Therefore, the P-polarized light reflection film 10 may be provided at a position where the projection image projected from the virtual image display apparatus 1 can be visually displayed.

That is, in the HUD system 20 according to the embodiment of the present invention, the P-polarized light reflection film 10 functions as a combiner of the HUD system. In the HUD system, the combiner means an optical member that can display a screen image projected from a virtual image display apparatus in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

The P-polarized light reflection film may be provided on the entire surface of the windshield glass, or may be provided on a part of the windshield glass in a plane direction, but is preferably provided on a part of the windshield glass.

In a case where the P-polarized light reflection film is provided on a part of the windshield glass, the P-polarized light reflection film may be provided at any position on the windshield glass, but the reflection film is preferably provided so that a virtual image is displayed at a position where the image can be easily visible from an observer such as a driver during the use of the HUD system. For example, a position where the P-polarized light reflection film is provided on the windshield glass may be determined based on the relationship between a position of the driver's seat in the vehicle in which the HUD system is mounted and a position where the virtual image display apparatus is installed.

The P-polarized light reflection film may have a flat surface shape having no curved surface, and may have a curved surface. In addition, the P-polarized light reflection film may have a concave or convex shape as an entirety, and the projection image may be displayed to be enlarged or reduced.

[1] P-Polarized Light Reflection Film

In the HUD system according to the embodiment of the present invention, the P-polarized light reflection film means a reflection film having a function of reflecting p-polarized light.

The P-polarized light reflection film 10 includes a selective reflection layer having a function of reflecting p-polarized light.

[Selective Reflection Layer]

It is preferable that the windshield glass used in the HUD system according to the embodiment of the present invention has a selective reflection layer including three wavelengths of $\lambda_B$, $\lambda_G$, and $\lambda_R$ as the selective reflection center wavelength at a light incidence angle of 60°.

400 nm≤$\lambda_B$≤500 nm 500 nm≤$\lambda_G$<600 nm 600 nm≤$\lambda_R$≤700 nm

In the present invention, the selective reflection center wavelength of the selective reflection layer and the half-width of the reflection peak having the selective reflection center wavelength are obtained as follows.

As will be described in detail in Examples below, in a case where a reflection spectrum at a desired light incidence angle (for example, 60°) with respect to the normal direction of the selective reflection layer is measured using a spectrophotometer (for example, manufactured by JASCO Corporation, trade name: V-670), a maximal peak of reflectivity is observed in a selective reflection band. Among the two wavelengths that are intermediate (average) reflectivity between a maximal reflectivity of the peak and a minimal reflectivity at the bottom of the maximal peak, in a case where a wavelength value of a shorter wavelength side is set $\lambda_l$ (nm) and a wavelength value of a longer wavelength side is set $\lambda_h$ (nm), the selective reflection center wavelength λ and the half-width Δλ thereof can be expressed by the following expression.

$$\lambda = (\lambda_1 + \lambda_h)/2$$

$$\Delta\lambda = (\lambda_h - \lambda_1)$$

In a case where the selective reflection layer consists of a cholesteric liquid crystal, the selective reflection center wavelength which is obtained as described above substantially coincides with a wavelength at the center of gravity of reflection peak of circular polarization reflection spectrum measured at a desired light incidence angle with respect to the normal direction of the selective reflection layer.

In addition, in the present invention, the natural light reflectivity at the selective reflection center wavelength of the selective reflection layer is also determined by the method described in Examples below.

The reflection spectrum of the selective reflection layer is measured in a state of the windshield glass including the selective reflection layer, as described in Examples below.

Preferred examples of the P-polarized light reflection film including the above-mentioned selective reflection layer include a P-polarized light reflection film including a cholesteric liquid crystal layer having a function of reflecting circularly polarized light, and a P-polarized light reflection film including a selective reflection layer (hereinafter, also referred to as a "dielectric multi-layer film") having a function of reflecting P-polarized light, which is formed by laminating an optically anisotropic layer and an optically isotropic layer.

Hereinafter, the P-polarized light reflection film will be sequentially described based on the P-polarized light reflection film 10A in the windshield glass 24A shown in FIG. 4 and the P-polarized light reflection film 10B in the windshield glass 24B shown in FIG. 5. In addition, the cholesteric liquid crystal layer and the dielectric multi-layer film will be respectively described in the description of each P-polarized light reflection film.

[1-1] P-Polarized Light Reflection Film Including Cholesteric Liquid Crystal Layer FIG. 4 is a diagram schematically showing an example of a windshield glass 24 used in the present invention, and a P-polarized light reflection film 10A included in the windshield glass 24 includes a polarization conversion layer 14, a selective reflection layer 11, a retardation layer 16, and a transparent substrate 18 in this order.

In a case where the windshield glass 24A including the P-polarized light reflection film 10A shown in FIG. 4 is provided as the windshield glass 24, first, the retardation layer 16 converts the p-polarized projection light incident from the second glass plate 28 side into circularly polarized light in the P-polarized light reflection film 10A. Next, the selective reflection layer 11 (cholesteric liquid crystal layer 12) selectively reflects the circularly polarized light, and the reflected circularly polarized light is incident in the retardation layer 16 again. Furthermore, the retardation layer 16 converts the circularly polarized light into p-polarized light. Thereby, the P-polarized light reflection film 10A reflects the incident p-polarized projection light as p-polarized light.

Therefore, the retardation layer 16 is set to convert the incident p-polarized light into circularly polarized light in a turning direction, which is reflected by the selective reflection layer 11, according to the sense of the circularly polarized light that is selectively reflected by the selective reflection layer 11 (cholesteric liquid crystal layer 12). That is, in a case where the selective reflection layer 11 selectively reflects the dextrorotatory circularly polarized light, the retardation layer 16 is set to make the incident p-polarized light dextrorotatory circularly polarized light. By contrast, in a case where the selective reflection layer 11 selectively reflects the levorotatory circularly polarized light, the retardation layer 16 is set to make the incident p-polarized light the levorotatory circularly polarized light.

The selective reflection layer 11 preferably includes three cholesteric liquid crystal layers (12R, 12G, and 12B). Three cholesteric liquid crystal layers have different selective reflection center wavelengths at a light incidence angle of 60°, and respectively correspond to a cholesteric liquid crystal layer 12B having a selective reflection center wavelength $\lambda_B$ at a light incidence angle of 60° which will be described later, a cholesteric liquid crystal layer 12G having a selective reflection center wavelength $\lambda_G$ at a light incidence angle of 60° which will be described later, and a cholesteric liquid crystal layer 12R having a selective reflection center wavelength $\lambda_R$ at a light incidence angle of 60° which will be described later. In the example shown in the drawing, the cholesteric liquid crystal layer 12R, the cholesteric liquid crystal layer 12G, and the cholesteric liquid crystal layer 12B are included in this order. In addition, in the example shown in the drawing, each of cholesteric liquid crystal layers is in direct contact with any other cholesteric liquid crystal layers.

Although not shown in FIG. 4, in addition to the three cholesteric liquid crystal layers (12R, 12G, and 12B), a cholesteric liquid crystal layer (hereinafter, referred to as cholesteric liquid crystal layer UV) having a selective reflection center wavelength of 300 nm or more and less than 400 nm at a light incidence angle of 60° is preferably included from the viewpoint of suppressing the reflection tint.

By providing the cholesteric liquid crystal layer UV, in the case of a configuration of a windshield glass including a cholesteric liquid crystal layer and a retardation layer which will be described later, it is possible to suppress a tint (particularly, a yellow tint) which is confirmed in a case where the windshield glass is observed under external light.

As is well known, a cholesteric liquid crystal layer is a layer composed of a liquid crystal compound in an alignment state of a helical structure in which a cholesteric liquid crystalline phase is immobilized, reflects light having a selective reflection center wavelength corresponding to a pitch of the helical structure, and transmits light in another wavelength range. In addition, the cholesteric liquid crystal layer exhibits selectively reflecting properties in response to either levorotatory circularly polarized light or dextrorotatory circularly polarized light at a specific wavelength.

In the selective reflection layer including the cholesteric liquid crystal layer, the reflected wavelength and reflectivity can be adjusted according to a selective reflection center wavelength and a thickness (the number of helical pitches) of the cholesteric liquid crystal layer, and the like.

Here, as shown in FIG. 4, individual cholesteric liquid crystal layers are preferably in direct contact with any other cholesteric liquid crystal layers. For example, in an example shown in FIG. 4, the cholesteric liquid crystal layer 12R having a selective reflection center wavelength $\lambda_R$ at a light incidence angle of 60° and the cholesteric liquid crystal layer 12G having a selective reflection center wavelength $\lambda_G$ at a light incidence angle of 60° are mutually contacted, and the cholesteric liquid crystal layer 12G having a selective reflection center wavelength $\lambda_G$ at a light incidence angle of 60° and the cholesteric liquid crystal layer 12B having a selective reflection center wavelength $\lambda_B$ at a light incidence angle of 60° are mutually contacted.

In a case where the cholesteric liquid crystal layers are spaced from each other, a film thickness between the layers is thick, and it is difficult to obtain the effect of interference of light reflected by each of the cholesteric liquid crystal layers. On the other hand, by adopting a configuration in which the cholesteric liquid crystal layers are in contact with each other, the wavelength bandwidth can be narrowed because of the effect of interference of light reflected by each of the cholesteric liquid crystal layers. In particular, in a case where a film thickness of each of the cholesteric liquid crystal layers is thinner than a wavelength of light (visible light of 380 nm to 780 nm), the effect of interference is more remarkable.

In the present invention, the cholesteric liquid crystal layers are not limited to a configuration in which the individual cholesteric liquid crystal layers are in direct contact with each other, and the cholesteric liquid crystal layers may be configured to be laminated via an adhesive layer or the like.

Here, each of the cholesteric liquid crystal layers may have at least one selective reflection center wavelength of the above-described three wavelengths $\lambda_B$, $\lambda_G$, and $\lambda_R$ as selective reflection center wavelengths at a light incidence angle of 60°, but at least one cholesteric liquid crystal layer may have two or more selective reflection center wavelengths. A cholesteric liquid crystal layer having two or more selective reflection center wavelengths is achieved by adopting a helical structure in which a helical pitch changes in a thickness direction.

In the example shown in the drawing, the selective reflection layer 11 has a configuration in which three cholesteric liquid crystal layers having different selective reflection center wavelengths are provided. However, the present invention is not limited thereto, and the selective reflection layer 11 may be a cholesteric liquid crystal layer having a single layer, and may be a cholesteric liquid crystal layer having two or four or more cholesteric liquid crystal layers.

From the viewpoint of exhibiting high transmittance while exhibiting sufficient natural light reflectivity by the selective reflection layer 11, the total thickness of the selective reflection layer 11 is preferably 0.5 to 30 μm and more preferably 1 to 15 μm.

In the P-polarized light reflection film as shown in FIG. 4, the selective reflection layer consisting of a cholesteric liquid crystal layer reflects circularly polarized light.

Therefore, the P-polarized light reflection film preferably has a layer that converts P-polarized light incident on the P-polarized light reflection film into circularly polarized light. Examples of the layer that converts a polarization state of light include a polarization conversion layer and a retardation layer.

The polarization conversion layer exhibits optical rotation properties and birefringence with respect to visible light, and converts a polarization state of incident light. In the present invention, the polarization conversion layer formed of a layer in which a material having birefringence, such as a liquid crystal compound, is aligned with the amount of twist at 360° or less.

In the retardation layer, a phase difference (optical path difference) is added to two orthogonal polarized light components to change the state of the incident polarized light. In the present invention, the retardation layer is a layer formed by a material having birefringence, such as a liquid crystal compound, which is aligned in the same direction, and does not have optical rotation properties.

By adopting a configuration in which the P-polarized light reflection film has a polarization conversion layer or a retardation layer on the selective reflection layer side onto which light is incident, P-polarized light incident on the P-polarized light reflection film is converted into circularly polarized light, the selective reflection layer reflects circularly polarized light, and the reflected circularly polarized light is converted into P-polarized light by the polarization conversion layer or the retardation layer and emitted.

Here, in the example of the windshield glass shown in FIG. 4, the P-polarized light reflection film 10A has the polarization conversion layer 14 on one surface side of the selective reflection layer 11, has the retardation layer 16 on the other surface side thereof, and is disposed such that the retardation layer 16 is on the second glass plate 28 side which is the inside of the vehicle and the polarization conversion layer 14 is on the first glass plate 30 side which is the outside of the vehicle.

In this case, the retardation layer 16 has a function of converting the projected p-polarized light into circularly polarized light reflected by the cholesteric liquid crystal layer of the selective reflection layer 11.

On the other hand, the polarization conversion layer 14 has a function of optically compensating for light incident from the outside of the windshield glass. For example, in a case of s-polarized light incident from the outside of the windshield glass, a polarization state changes when the s-polarized light passes through the retardation layer 16, and a component of p-polarized light is mixed. Since a polarized sunglass cuts off the s-polarized light, this component of the p-polarized light transmits the polarized sunglass. Therefore, there is a problem that the function of the polarized sunglass to cut off the glare of the reflected light that is mainly composed of s-polarized light is impaired, which hinders driving. On the other hand, a configuration in which the polarization conversion layer 14 is provided, and the polarization conversion layer 14 is used for optical compensation enables an improvement of the suitability for polarized sunglass.

In the example illustrated in FIG. 4, the P-polarized light reflection film 10A has a configuration in which the polarization conversion layer 14 is arranged on the side of the first glass plate 30, which is the outside of the vehicle, and the retardation layer 16 is arranged on the side of the second glass plate 28, which is on the inside of the vehicle, but the present invention is not limited thereto. The P-polarized light reflection film 10A may have a configuration in which the polarization conversion layer 14 is arranged on the side of the second glass plate 28, which is the inside of the vehicle, and the retardation layer 16 is arranged on the side of the first glass plate 30, which is the outside of the vehicle.

In this case, the polarization conversion layer 14 has a function of converting the projected p-polarized light into circularly polarized light reflected by the cholesteric liquid crystal layer of the selective reflection layer 11.

On the other hand, the retardation layer 16 has a function of optically compensating for light incident from the outside of the windshield glass, and optical compensation by the retardation layer 16 enables an improvement of the suitability for the polarized sunglass.

In addition, the P-polarized light reflection film 10A may have a configuration in which polarization conversion layers are provided on both sides of the selective reflection layer 11 or a configuration in which retardation layers are provided on both sides.

In this case, a polarization conversion layer or a retardation layer arranged inside the vehicle may be configured to have a function of converting the projected p-polarized light into circularly polarized light reflected by the cholesteric liquid crystal layer of the selective reflection layer 11.

By contrast, a polarization conversion layer or a retardation layer arranged on the outside of the vehicle may be configured to have a function of optically compensating for light incident from the outside of the windshield glass.

The polarization conversion layer and the retardation layer will be described in detail later.

Hereinafter, the cholesteric liquid crystal layer, the polarization conversion layer, the retardation layer, and the transparent substrate, which are constituent elements of the P-polarized light reflection film 10A including the cholesteric liquid crystal layer, will be described in detail.

[Cholesteric Liquid Crystal Layer]

It is preferable that the cholesteric liquid crystal layer includes the above-described three wavelengths of $\lambda_B$, $\lambda_G$, and $\lambda_R$ as the selective reflection center wavelength at a light incidence angle of 60°.

In the present invention, a cholesteric liquid crystal layer means a layer formed with a cholesteric liquid crystalline phase being immobilized.

The cholesteric liquid crystal layer may be any layer as long as the alignment of a liquid crystal compound serving as the cholesteric liquid crystalline phase is maintained. The cholesteric liquid crystal layer may be typically a layer that is changed into state in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

It is known that the cholesteric liquid crystalline phase exhibits properties of selectively reflecting circularly polarized light, that is, the cholesteric liquid crystalline phase selectively reflects circularly polarized light with any one sense of levorotatory circularly polarized light or dextrorotatory circularly polarized light, and transmits circularly polarized light with the other sense.

A large number of films formed of a composition including a polymerizable liquid crystal compound have been known in the related art, as a film including a layer with a cholesteric liquid crystalline phase, which exhibits properties of selectively reflecting circularly polarized light and is immobilized. Thus, regarding the cholesteric liquid crystal layer, the technologies of the related art can be referred to.

A center wavelength λ of selective reflection (selective reflection center wavelength) of the cholesteric liquid crystal layer at a light incidence angle of 5° depends on a pitch P (=a period of a helix) of a helical structure (helical alignment structure) in the cholesteric liquid crystalline phase, and is based on a relationship between an average refractive index n of the cholesteric liquid crystal layer and $\lambda=n\times P$. As is clear from the above Expression, the selective reflection center wavelength can be controlled by adjusting the n value and/or the P value.

In other words, the pitch P (one pitch of a helix) of the helical structure is the length in the helical axial direction for one turn of a helix, that is the length in the helical axial direction in which a director (the major axis direction in a rod-like liquid crystal) of the liquid crystal compound for forming the cholesteric liquid crystalline phase is rotated by 360°. The helical axial direction of the normal cholesteric liquid crystal layer coincides with a thickness direction of the cholesteric liquid crystal layer.

In the head-up display system described above, the reflectivity at the surface of a glass plate on the projection light incidence side can be decreased by using the head-up display system so that light is obliquely incident on the windshield glass.

At this time, light is also obliquely incident on the cholesteric liquid crystal layer constituting the selective reflection layer 11 of the P-polarized light reflection film 10A. For example, light that is incident at an angle of 45° to 70° relative to the normal line of the P-polarized light reflection film 10A in the air having a refractive index of 1 is transmitted through a cholesteric liquid crystal layer having a refractive index of about 1.61 at an angle of about 26° to 36°. In this case, the reflection wavelength shifts to the shorter wavelength side.

In a case where the selective reflection center wavelength at a light incidence angle of 5° is a wavelength λd when a ray passes through a cholesteric liquid crystal layer having the selective reflection center wavelength as a wavelength λ at an angle θ2 with respect to the normal direction of the cholesteric liquid crystal layer (helical axial direction of cholesteric liquid crystal layer), the wavelength λd is represented by the following Expression.

$$\lambda d = \lambda \times \cos\theta 2$$

Therefore, the cholesteric liquid crystal layer having a selective reflection center wavelength in a range of 650 to 780 nm at an angle θ2 of 26° to 36° can reflect projection light in a range of 520 to 695 nm, for example.

Such a wavelength range is a wavelength range with high luminosity factor and thus highly contributes to the brightness of the projection image, and as a result, a projection image with high brightness can be realized.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration. As a method of measuring helical sense and pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

As each cholesteric liquid crystal layer, a cholesteric liquid crystal layer in which the helical sense is right or left is used. The sense of circularly polarized light reflected by the cholesteric liquid crystal layer (turning direction of circularly polarized light) coincides with a helical sense.

In a case where the plurality of cholesteric liquid crystal layers having selective reflection center wavelengths different from each other are provided, a helical sense of each cholesteric liquid crystal layer may be the same as each other or different from each other.

However, it is preferable that all of helical senses of the plurality of cholesteric liquid crystal layers are the same as each other.

In a case where the P-polarized light reflection film 10A includes a plurality of the cholesteric liquid crystal layers as the selective reflection layer 11, the P-polarized light reflection film 10A preferably does not include cholesteric liquid crystal layers having different helical senses as cholesteric liquid crystal layers that exhibit selective reflection in the same or overlapping wavelength range. The reason for this is to avoid a decrease in the transmittance to, for example, less than 50% in a specific wavelength range.

A half-width Δλ (nm) of a selective reflection band exhibiting selective reflection depends on the birefringence Δn of the liquid crystal compound and the pitch P and satisfies a relationship of $\Delta\lambda = \Delta n \times P$. Accordingly, a width of the selective reflection band can be controlled by adjustment of the Δn. The value of Δn can be adjusted by adjusting the type of the polymerizable liquid crystal compound or a mixing ratio thereof or controlling a temperature at the time of immobilizing the alignment.

In order to form one type of cholesteric liquid crystal layer having the same selective reflection center wavelength, a plurality of cholesteric liquid crystal layers having the same pitch P and the same helical sense may be laminated. By lamination of the cholesteric liquid crystal layers having the same pitch P and the same helical sense, the circular polarization selectivity at a specific wavelength can be increased.

In the selective reflection layer 11, in a case where the plurality of cholesteric liquid crystal layers are laminated, a separately produced cholesteric liquid crystal layer may be laminated using an adhesive or the like, or a step of directly applying a liquid crystal composition containing a polymerizable liquid crystal compound and the like to the surface of the cholesteric liquid crystal layer formed by a method which will be described later, and carrying out alignment and immobilization may be repeatedly performed, and the latter is preferable.

This is because, by directly forming a subsequent cholesteric liquid crystal layer to the surface of a cholesteric liquid crystal layer formed in advance, an alignment direction of liquid crystal molecules on an air interface side of the cholesteric liquid crystal layer formed in advance and an alignment direction of liquid crystal molecules on a lower side of the cholesteric liquid crystal layer formed thereon coincide with each other, and excellent polarization properties of the laminate of the cholesteric liquid crystal layers are obtained. In addition, this is because, interference unevenness which may occur due to uneven thickness of the adhesive layer is not observed.

The thickness of the cholesteric liquid crystal layer is preferably 0.2 to 10 μm, more preferably 0.3 to 8 μm, and even more preferably 0.4 to 5 μm.

(Production Method of Cholesteric Liquid Crystal Layer)

Hereinafter, a material and a method for producing the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition with a surfactant, a polymerization initiator, or the like being further mixed and dissolved in a solvent or the like, as necessary, is applied to a support, an alignment layer, and a cholesteric liquid crystal layer to serve as an underlayer. After cholesteric alignment is matured, the alignment can be immobilized by curing of the liquid crystal composition to form a cholesteric liquid crystal layer.

(Polymerizable Liquid Crystal Compound)

The polymerizable liquid crystal compound may be a rod-like liquid crystal compound or a disk-like liquid crystal compound, and a rod-like liquid crystal compound is preferable.

As an example of the rod-like polymerizable liquid crystal compound for forming the cholesteric liquid crystal layer, a rod-like nematic liquid crystal compound is used. As the rod-like nematic liquid crystal compound, an azomethine compound, an azoxy compound, a cyanobiphenyl compound, a cyanophenyl ester compound, a benzoic acid ester compound, a cyclohexanecarboxylic acid phenyl ester compound, a cyanophenylcyclohexane compound, a cyano-substituted phenylpyrimidine compound, an alkoxy-substituted phenylpyrimidine compound, a phenyldioxane compound, a tolane compound, or an alkenylcyclohexylbenzonitrile compound is preferably used. Not only a low-molecular-weight liquid crystal compound but also a polymer liquid crystal compound can be used.

The polymerizable liquid crystal compound is obtained by introducing a polymerizable group into the liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into the molecules of the liquid crystal compound using various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Materials, vol. 5, pp. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-016616A (JP-H06-016616A), JP1995-110469A (JP-H07-110469A), JP1999-080081A (JP-H11-080081A), JP2001-328973A, and the like. Two or more polymerizable liquid crystal compounds may be used in combination. In a case where two or more kinds of polymerizable liquid crystal compounds are used in combination, an alignment temperature can be decreased.

The addition amount of the polymerizable liquid crystal compound contained in the liquid crystal composition is preferably 80% to 99.9% by mass, more preferably 85% to 99.5% by mass, and particularly preferably 90% to 99% by mass with respect to the mass of solid content (the mass excluding a solvent) in the liquid crystal composition.

In order to improve the visible light transmittance, the cholesteric liquid crystal layer may have a low $\Delta n$.

The cholesteric liquid crystal layer having a low $\Delta n$ can be formed by using a low $\Delta n$ polymerizable liquid crystal compound. Hereafter, the low-$\Delta n$ polymerizable liquid crystal compound will be specifically described.

(Low-$\Delta n$ Polymerizable Liquid Crystal Compound)

A cholesteric liquid crystalline phase is formed by using the low-$\Delta n$ polymerizable liquid crystal compound, and the cholesteric liquid crystalline phase is immobilized to form a film, thereby obtaining a narrow-band selective reflection layer. Examples of the polymerizable liquid crystal compounds having a low $\Delta n$ include compounds described in WO2015/115390A, WO2015/147243A, WO2016/035873A, JP2015-163596A, and JP2016-053149A. With regard to the liquid crystal composition imparting a selective reflection layer having a small half-width, the description in WO2016/047648A can be referred to, and preferred examples thereof include the polymerizable compound represented by Formula (I) described in WO2016/047648A.

Specific examples of the polymerizable compound represented by Formula (I) described in WO2016/047648A include compounds described in paragraphs 0051 to 0058 of WO2016/047648A, compounds described in JP2013-112631A, JP2010-070543A, JP4725516B, WO2015/115390A, WO2015/147243A, WO2016/035873A, JP2015-163596A, and JP2016-053149A, or the like.

(Chiral Agent: Optically Active Compound)

The chiral agent has a function of inducing a helical structure of the cholesteric liquid crystalline phase. Chiral agent may be selected according to the purpose because induced helical senses or helical pitches are different depending on compounds.

The chiral agent is not particularly limited and normal compounds can be used.

Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, or JP2014-034581A.

The chiral agent generally includes chiral carbon atoms. However, an axially chiral compound or a planar chiral compound, which does not have chiral carbon atoms, can also be used as a chiral agent. Examples of the axially chiral compound or the planar chiral compound include binaphthyl, helicene, paracyclophane, and derivatives thereof.

The chiral agent may also have a polymerizable group. In a case where both the chiral agent and the liquid crystal compound contain polymerizable groups, a polymer that includes a repeating unit derived from a polymerizable liquid crystal compound and a repeating unit derived from the chiral agent can be formed by a polymerization reaction of a polymerizable chiral agent and the polymerizable liquid crystal compound. In this aspect, the polymerizable group contained in the polymerizable chiral agent is preferably the same group as the polymerizable group contained in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC 756 (trade name) manufactured by BASF SE may be used.

A content of the chiral agent in the liquid crystal composition is preferably 0.01% to 200% by mol and more preferably 1% to 30% by mol, with respect to the amount of the polymerizable liquid crystal compound.

In addition, as described above, the cholesteric liquid crystal layer of the selective reflection layer included in the P-polarized light reflection film may have two or more selective reflection center wavelengths. A cholesteric liquid crystal layer having two or more selective reflection center wavelengths is achieved by causing pitches of the helical structure to be changed in a thickness direction. The irradiation amount of light can be changed in the thickness direction to produce the cholesteric liquid crystal layer in which the pitches of the helical structure change in the thickness direction by using a chiral agent with helical twisting power (HTP) changing upon irradiation with light.

In addition, examples of the chiral agent with the HTP changing upon irradiation with light include a chiral agent that causes return isomerization, dimerization, isomerization and dimerization, and the like upon irradiation with light.

In a case where the chiral agent has a photoisomerization group, the photoisomerization group is preferably an isomerization moiety, an azo group, an azoxy group, or a cinnamoyl group of a compound exhibiting photochromic properties. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

(Polymerization Initiator)

The liquid crystal composition preferably includes a polymerization initiator. In an aspect of carrying out a polymerization reaction with ultraviolet light irradiation, the polymerization initiator used is preferably a photopolymerization initiator capable of starting a polymerization reaction with ultraviolet light irradiation.

Examples of the photopolymerization initiator include α-carbonyl compounds (described in each specification of U.S. Pat. Nos. 2,367,661A and 2,367,670A), acyloin ether compounds (described in U.S. Pat. No. 2,448,828A), α-hydrocarbon-substituted aromatic acyloin compounds (described in U.S. Pat. No. 2,722,512A), polynuclear quinone compounds (described in U.S. Pat. No. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-S60-105667A), U.S. Pat. No. 4,239,850A), acylphosphine oxide compounds (described in JP1988-040799B (JP-S63-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs 0500 to 0547 of JP2012-208494A can also be referred to.

As the polymerization initiator, it is also preferable to use the acylphosphine oxide compounds or the oxime compounds.

As the acylphosphine oxide compounds, for example, IRGACURE 810 (trade name, compound name: bis(2,4,6-trimethylbenzoyl)-phenylphosphine oxide) which is a commercially available product and manufactured by BASF Japan Ltd. can be used. As the oxime compound, a commercially available product such as IRGACURE OXE01 (trade name, manufactured by BASF SE), IRGACURE OXE02 (trade name, manufactured by BASF SE), TR-PBG-304 (trade name, manufactured by Changzhou Tronly New E1ectronic Materials Co., Ltd.), ADEKA ARKLS NCI-930 (trade name, manufactured by Adeka Corporation), ADEKA ARKLS NCI-831 (trade name, manufactured by Adeka Corporation), and the like can be used.

The polymerization initiators may be used alone or in combination of two or more kinds.

A content of the photopolymerization initiator in the liquid crystal composition is preferably 0.1% to 20% by mass and more preferably 0.5% to 5% by mass, with respect to a content of the polymerizable liquid crystal compound.

(Crosslinking Agent)

In order to improve a film hardness after curing and to improve durability, the liquid crystal composition may include any crosslinking agent. The crosslinking agent which is cured with ultraviolet light, heat, or moisture can be suitably used.

The crosslinking agent is not particularly limited, and can be appropriately selected according to the purpose. Examples of the crosslinking agent include a polyfunctional acrylate compound such as trimethylolpropane tri(meth) acrylate, or pentaerythritol tri(meth)acrylate; an epoxy compound such as glycidyl (meth)acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; and an alkoxysilane compound such as vinyltrimethoxysilane or N-(2-aminoethyl) 3-aminopropyltrimethoxysilane. In addition, according to the reactivity of the crosslinking agent, a normal catalyst can be used, and the productivity can be improved in addition to the improvement of film hardness and durability. These may be used alone or in combination.

The content of the crosslinking agent in the liquid crystal composition is preferably 3% to 20% by mass and more preferably 5% to 15% by mass with respect to the mass of solid contents in the liquid crystal composition (the mass excluding the solvent). By setting the content of the crosslinking agent to 3% by mass or more, the effect of improving a crosslinking density can be obtained, and by setting the content of the crosslinking agent 20% by mass or less, a reduction in the stability of the cholesteric liquid crystal layer can be prevented.

The term "(meth)acrylate" is used in the meanings of "either one of or both of acrylate and methacrylate".

(Alignment Control Agent)

An alignment control agent which contributes to stably or rapidly setting the cholesteric liquid crystal layer as a cholesteric liquid crystal layer having planar alignment, may be added into the liquid crystal composition. Examples of the alignment control agent include a fluorine (meth)acrylate-based polymer disclosed in paragraphs to of JP2007-272185A, compounds represented by Formulae (I) to (IV) disclosed in paragraphs to of JP2012-203237, and compounds disclosed in JP2013-113913.

The alignment control agent may be used singly or in combination of two or more kinds thereof.

The amount of the alignment control agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

The liquid crystal composition may also include at least one kind selected from various additives such as a surfactant for adjusting the surface tension of a coating film and setting an even film thickness, a polymerizable monomer, and the like. In addition, a polymerization inhibitor, an antioxidant, an ultraviolet absorber, a light stabilizer, a coloring material, and metal oxide fine particles may be further added into the liquid crystal composition, as necessary, in a range not deteriorating the optical performance.

Regarding the cholesteric liquid crystal layer, a cholesteric liquid crystal layer having immobilized cholesteric regularity can be formed according to the following procedure of: applying a liquid crystal composition, in which a polymerizable liquid crystal compound, a polymerization initiator, and as necessary, a chiral agent, a surfactant, or other agents are dissolved in a solvent, onto a transparent substrate, a retardation layer, an alignment layer, or a cholesteric liquid crystal layer which is produced in advance; drying the liquid crystal composition to obtain a coating film, and irradiating this coating film with an actinic ray to carry out the polymerization of a cholesteric liquid crystalline composition.

A laminated film consisting of a plurality of the cholesteric liquid crystal layers can be formed by the above-described steps for manufacturing the cholesteric liquid crystal layer being repeatedly carried out.

(Solvent)

A solvent used for preparing the liquid crystal composition is not particularly limited, and is appropriately selected according to the purpose, and an organic solvent is preferably used.

The organic solvent is not particularly limited, and is appropriately selected according to the purpose, and examples thereof include ketones, alkyl halides, amides, sulfoxides, heterocyclic compounds, hydrocarbons, esters, and ethers. These may be used alone or in combination. Among these, a ketone is particularly preferable in consideration of an environmental burden.

(Coating, Alignment, and Polymerization)

A coating method of the transparent substrate, the alignment layer, the cholesteric liquid crystal layer serving as an underlayer, and other layers with the liquid crystal composition is not particularly limited, and can be appropriately selected in accordance with the purpose. Examples of the coating method include wire bar coating method, curtain coating method, extrusion coating method, direct gravure coating method, reverse gravure coating method, die coating method, spin coating method, dip coating method, spray coating method, slide coating method, and the like. In addition, a method of transferring the liquid crystal composition which is separately applied onto a support can also be implemented.

Liquid crystal molecules are aligned by heating the coated liquid crystal composition. A heating temperature is preferably 200° C. or lower and more preferably 130° C. or lower. By this alignment treatment, an optical thin film in which the polymerizable liquid crystal compound is twist-aligned so as to have a helical axis in a direction substantially perpendicular to a film surface is obtained.

The aligned liquid crystal compound is further polymerized and thereby the liquid crystal composition can be cured. The polymerization may be any of thermal polymerization or photopolymerization with light irradiation, and photopolymerization is preferable. The light irradiation is preferably performed by using ultraviolet light. The irradiation energy is preferably 20 $mJ/cm^2$ to 50 $J/cm^2$ and more preferably 100 to 1,500 $mJ/cm^2$.

In order to accelerate the photopolymerization reaction, the light irradiation may be performed under heating conditions or in a nitrogen atmosphere. The wavelength of ultraviolet light-irradiated is preferably 350 to 430 nm. A high polymerization reaction rate is preferable, and specifically, a reaction rate is preferably 70% or more and more preferably 80% or more, from a viewpoint of stability. The polymerization reaction rate can be determined by measuring the consumption rate of polymerizable functional groups using an infrared absorption spectrum.

[Polarization Conversion Layer]

The polarization conversion layer 14 is preferably a layer with a helical alignment structure of the liquid crystal compound, which is immobilized, and the number of pitches x of the helical alignment structure and a film thickness y (unit: μm) of the polarization conversion layer satisfy all of Relational Expressions (a) to (c) as follows.

$$0.1 \leq x \leq 1.0 \quad \text{Expression (a)}$$

$$0.5 \leq y \leq 3.0 \quad \text{Expression (b)}$$

$$3{,}000 \leq (1{,}560 \times y)/x \leq 50{,}000 \quad \text{Expression (c)}$$

One pitch of the helical structure of the liquid crystal compound is one turn of a helix of the liquid crystal compound.

That is, the number of pitches in a state in which the director (the major axis direction in the case of a rod-like liquid crystal) of the helically aligned liquid crystal compound is rotated by 360° is defined as 1.

In a case where the polarization conversion layer has the helical structure of the liquid crystal compound, the polarization conversion layer exhibits optical rotation properties and birefringence with respect to visible light having a wavelength shorter than a reflection peak wavelength in the infrared region. Therefore, the polarized light in the visible range can be controlled. In a case where the pitch number x of the helical alignment structure of the polarization conversion layer and the film thickness y of the polarization conversion layer is set within the above ranges, a function of optically compensating the visible light with the polarization conversion layer or a function of converting P-polarized light incident into P-polarized light reflection film into circularly polarized light can be imparted.

The polarization conversion layer exhibits optical rotation properties and birefringence with respect to visible light because the liquid crystal compound has the helical structure satisfying Relational Expressions (a) to (c). Particularly, by setting the pitch P of the helical structure of the polarization conversion layer to have a length corresponding to the pitch P of the cholesteric liquid crystal layer in which the selective reflection center wavelength is within the long wavelength infrared region, it is possible to exhibit high optical rotation properties and birefringence with respect to visible light having a short wavelength.

Relational Expression (a) is "$0.1 \leq x \leq 1.0$".

In a case where the number of pitches x of the helical structure is less than 0.1, disadvantages, such as insufficient optical rotation properties and birefringence, are caused.

In addition, in a case where the number of pitches x of the helical structure is more than 1.0, disadvantages that optical rotation properties and birefringence are excessive, and desired elliptical polarized light cannot be obtained are caused.

Relational Expression (b) is "$0.5 \leq y \leq 3.0$".

In a case where the thickness y of the polarization conversion layer is less than 0.5 μm, the film thickness is too thin, disadvantages, such as insufficient optical rotation properties and birefringence, are caused.

In a case where the thickness y of the polarization conversion layer is more than 3.0 μm, disadvantages that optical rotation properties and birefringence are excessive, desired circularly polarized light cannot be obtained, and poor alignment is likely to occur, which is not preferable for production, are caused.

Relational Expression (c) is "$3{,}000 \leq (1{,}560 \times y)/x \leq 50{,}000$".

In a case where "$(1{,}560 \times y)/x$" is less than 3,000, disadvantages that optical rotation properties are excessive, and desired polarized light cannot be obtained are caused.

In a case where "$(1{,}560 \times y)/x$" is more than 50,000, disadvantages that optical rotation properties are insufficient, and desired polarized light cannot be obtained are caused.

In the present invention, the number of pitches x of the helical structure of the polarization conversion layer is more preferably 0.1 to 0.8, and the film thickness y is more preferably 0.6 μm to 2.6 μm. In addition, "$(1{,}560 \times y)/x$" is more preferably 5,000 to 13,000.

That is, it is preferable that the polarization conversion layer has a long pitch P of the helical structure and a small number of pitches x.

Specifically, in the polarization conversion layer, it is preferable that the helical pitch P is equal to a pitch P of the cholesteric liquid crystal layer in which the selective reflection center wavelength is within the long wavelength infrared region, and the number of pitches x is small. More specifically, in the polarization conversion layer, it is preferable that the helical pitch P is equal to a pitch P of the cholesteric liquid crystal layer in which the selective reflection center wavelength is within 3,000 to 10,000 nm, and the number of pitches x is small.

Since the selective reflection center wavelength corresponding to the pitch P in the polarization conversion layer is much longer than that of visible light, the above-described optical rotation properties and birefringence with respect to visible light are more suitably exhibited.

The polarization conversion layer can be basically formed in the same manner as a normal cholesteric liquid crystal layer. However, during the formation of the polarization conversion layer, it is necessary to adjust the liquid crystal compound to be used, the chiral agent to be used, the amount of the chiral agent added, the film thickness, and the like so that the number of pitches x and the film thickness y [μm] of the helical structure in the polarization conversion layer satisfy all of Relational Expressions (a) to (c).

<Layer with Helical Alignment Structure (Helical Structure) of Liquid Crystal Compound, which is Immobilized>

The layer with a helical alignment structure (helical structure) of the liquid crystal compound, which is immobilized, is a so-called cholesteric liquid crystal layer, and means a layer in which a cholesteric liquid crystalline phase is immobilized.

The cholesteric liquid crystal layer may be any layer as long as the alignment of a liquid crystal compound serving as the cholesteric liquid crystalline phase is maintained. The cholesteric liquid crystal layer may be typically a layer that is changed into state in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

As described above, a center wavelength λ of selective reflection (selective reflection center wavelength) by the cholesteric liquid crystal layer depends on a pitch P (=a period of a helix) of a helical structure (helical alignment structure) in the cholesteric liquid crystalline phase, and is based on a relationship between an average refractive index n of the cholesteric liquid crystal layer and $2=n\times P$. As is clear from the above Expression, the selective reflection center wavelength can be controlled by adjusting the n value and/or the P value.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration.

As described above, in the cholesteric liquid crystal layer used as the polarization conversion layer, the helical pitch is adjusted so that the selective reflection center wavelength is within the infrared region at a long wavelength.

The method for forming the cholesteric liquid crystal layer as the polarization conversion layer is basically the same as the above-described method for forming the cholesteric liquid crystal layer.

[Retardation Layer]

In the retardation layer, a phase difference (optical path difference) is added to two orthogonal polarized light components to change the state of the incident polarized light.

In a case where the retardation layer is arranged on the outside of the vehicle and optically compensates, a front phase difference of the retardation layer may be a phase difference that can optically compensate.

In this case, the retardation layer preferably has a front retardation of 50 nm to 160 nm at a wavelength of 550 nm.

In addition, in a case where the windshield glass having the P-polarized light reflection film is mounted in the vehicle, and a direction corresponding to the upper vertical direction of a surface of the second glass plate is 0°, an angle of the slow axis is preferably 10° to 50° or −50° to −10°.

In addition, in a case where the retardation layer converts P-polarized light into circularly polarized light, the retardation layer is preferably configured to provide λ/4 as the front phase difference, and may be configured to provide 3λ/4 as the front phase difference. In addition, the angle of the slow axis may be arranged to change the incident P-polarized light into circularly polarized light.

In this case, for example, the front phase difference of the retardation layer at a wavelength of 550 nm is preferably in a range of 100 to 450 nm, and more preferably in a range of 120 to 200 nm or 300 to 400 nm. In addition, in a case where the P-polarized light reflection film 10 is used in a head-up display system, the direction of the slow axis of the retardation layer is preferably determined in accordance with the incident direction of projection light for displaying projection images and the helical sense of the cholesteric liquid crystal layer constituting the selective reflection layer.

The retardation layer is not particularly limited, and can be appropriately selected according to the purpose. Examples of the retardation layer include a stretched polycarbonate film, a stretched norbornene-based polymer film, a transparent film in which inorganic particles having birefringence such as strontium carbonate are included and aligned, a thin film in which oblique deposition of an inorganic dielectric is performed on a support, a film in which the polymerizable liquid crystal compound is uniaxially aligned and the alignment is immobilized, a film in which the liquid crystal compound is uniaxially aligned and the alignment is immobilized, and the like.

Among these, the retardation layer is suitably a film obtained by uniaxially aligning and immobilizing a polymerizable liquid crystal compound.

As an example, the retardation layer can be formed in the following order. A liquid crystal composition including a polymerizable liquid crystal compound is applied on a transparent substrate, a temporary support or the surface of the alignment layer, the polymerizable liquid crystal compound in the liquid crystal composition is formed in a nematic alignment in a liquid crystal state, and then the polymerizable liquid crystal compound is immobilized by curing to form the retardation layer.

In this case, the formation of the retardation layer can be carried out in the same manner as the formation of the cholesteric liquid crystal layer, except that no chiral agent is added to the liquid crystal composition. However, during the formation of the nematic alignment after applying the liquid crystal composition, the heating temperature is preferably 50° C. to 120° C., and more preferably 60° C. to 100° C.

The retardation layer may be a layer formed by applying a composition including a polymer liquid crystal compound on the transparent substrate, the temporary support, the surface of the alignment layer or the like, forming the nematic alignment in a liquid crystal state, cooling the composition, and then obtained by immobilizing the alignment.

The thickness of the retardation layer is not limited, but is preferably 0.2 to 300 μm, more preferably 0.5 to 150 μm, and even more preferably 1.0 to 80 μm. In addition, the thickness of the retardation layer formed of the liquid crystal composition is not particularly limited, and is preferably 0.2 to 10 μm, more preferably 0.5 to 5.0 μm, and even more preferably 0.7 to 2.0 μm.

In the retardation layer, for example, a slow axis inclined at an angle α is set with respect to an axis of the retardation layer in any direction. The direction of the slow axis can be set by, for example, rubbing treatment on an alignment film serving as the underlayer of the retardation layer.

The P-polarized light reflection film may include a layer in addition to the selective reflection layer, the polarization conversion layer, and the retardation layer, which are described above. For example, the P-polarized light reflection film may include a transparent substrate, an adhesive layer, or the like.

For example, in the example illustrated in FIG. 4, the P-polarized light reflection film 10A includes the transparent substrate 18 that is arranged on the side opposite to the selective reflection layer 11 of the retardation layer 16. The transparent substrate 18 supports the retardation layer 16, the selective reflection layer 11 (cholesteric liquid crystal layer), and the polarization conversion layer 14. The transparent substrate 18 may be used to as a support for forming the retardation layer 16, the selective reflection layer 11 (cholesteric liquid crystal layer), and the polarization conversion layer 14.

The P-polarized light reflection film may have a thin film-shape, a sheet-shape, or the like. The P-polarized light reflection film may have a roll-shape as a thin film before used for the windshield glass.

All of the transparent substrate (support), the adhesive layer, and the like are preferably transparent in the visible light range.

In addition, all of the transparent substrate, the adhesive layer, and the like preferably have low birefringence. The term "low birefringence" means that a front phase difference in a wavelength range where the selective reflection layer included in the windshield glass used in the present invention exhibits the reflection is 10 nm or less. This front phase difference is preferably 5 nm or less. Furthermore, all of the support, the adhesive layer, and other components preferably have a small difference in a refractive index from the average refractive index (in-plane average refractive index) of the selective reflection layer.

[Transparent Substrate]

The transparent substrate can also be used as a substrate plate for forming the selective reflection layer. The transparent substrate used for forming the selective reflection layer may be a temporary support that is peeled off after the formation of the selective reflection layer. Therefore, the transparent substrate may not be included in the completed P-polarized light reflection film and windshield glass. In a case where the completed P-polarized light reflection film or windshield glass includes the transparent substrate instead of peeling off as the temporary support, the transparent substrate is preferably transparent in the visible light range.

Materials of the transparent substrate are not limited. Examples of the transparent substrate include plastic films of polyester such as polyethylene terephthalate (PET), polycarbonate, an acrylic resin, an epoxy resin, polyurethane, polyamide, polyolefin, cellulose derivative, and silicone. As the temporary support, glass may be used in addition to the plastic films.

A thickness of the transparent substrate may be approximately 5.0 to 1000 μm, is preferably 10 to 250 μm, and more preferably 15 to 90 μm.

Here, in a case where the transparent substrate is disposed on the outside of the vehicle with respect to the selective reflection layer, it is preferable that the transparent substrate includes an ultraviolet absorber.

In a case where the transparent substrate contains the ultraviolet absorber, deterioration of the P-polarized light reflection film (selective reflection layer) by ultraviolet light can be suppressed.

[1-2] P-Polarized Light Reflection Film Including Dielectric Multi-Layer Film

FIG. 5 is a schematic view showing an example of the windshield glass used in the present invention, and the P-polarized light reflection film 10B included in the windshield glass 24B is formed of a selective reflection layer (dielectric multi-layer film) in which optically anisotropic layers (13Ra, 13Ga, 13Ba) and optically isotropic layers (13Rb, 13Gb, 13Ba) are alternately laminated. In the example shown in the drawing, the P-polarized light reflection film 10B includes a first laminated portion 13R in which an optically isotropic layer 13Ra and an optically anisotropic layer 13Rb are alternately laminated, a second laminated portion 13G in which an optically isotropic layer 13Ga and an optically anisotropic layer 13Gb are alternately laminated, and a third laminated portion 13B in which an optically isotropic layer 13Ba and an optically anisotropic layer 13Bb are alternately laminated.

It is preferable that the dielectric multi-layer film includes the above-described three wavelengths of $\lambda_B$, $\lambda_G$, and $\lambda_R$ as the selective reflection center wavelength at a light incidence angle of 60°.

In a case where the windshield glass 24B including the P-polarized light reflection film 10B shown in FIG. 5 is provided as the windshield glass 24, the p-polarized projection light incident from the second glass plate 28 side is reflected selectively as p-polarized light in the P-polarized light reflection film 10B.

In the first laminated portion 13R, the second laminated portion 13G, and the third laminated portion 13B, the thicknesses of the optically anisotropic layer and the thicknesses of the optically isotropic layer are different from each other. In addition, the number of laminated layers, the refractive index, and the like may be different.

In addition, in the P-polarized light reflection film 10B, the refractive indices $n_{e1}$ in the slow axis direction of the optically anisotropic layer exceed the refractive indices $n_{o2}$ of the optically isotropic layer (that is, $n_{e1}>n_{o2}$), and the refractive indices $n_{o1}$ in the direction orthogonal to the slow axis of the optically anisotropic layer are substantially the same as the refractive indices $n_{o2}$ of the optically isotropic layer.

Figure 6:
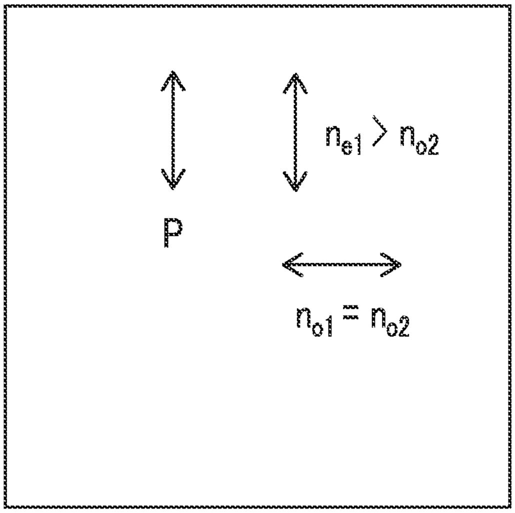
FIG. 6 is a schematic view showing the relationship between the refractive indices of the P-polarized light reflection film in a case where the windshield glass of FIG. 5 is viewed from the front.

A plurality of the optically anisotropic layers are laminated so that the slow axes of the optically anisotropic layers parallel to each other. Therefore, as shown in FIG. 6, in a certain direction (vertical direction in FIG. 6), layers each of which has the high refractive index ($n_{e1}$) and layers each of which has the low refractive index ($n_{o2}$) are laminated. On the other hand, the layers having the same refractive indices are laminated in a direction (left-right direction in FIG. 6) orthogonal to this direction.

In a case where the P-polarized light reflection film 10B is disposed in the HUD system 20 shown in FIGS. 1 to 3, the P-polarized light reflection film 10B is disposed such that the axis P of the P-polarized light reflection film 10B shown in FIG. 6 coincides with the vertical direction Y of the windshield glass 24.

It is known that a film in which a layer having a low refractive index (layer of low refractive index) and a layer having a high refractive index (layer of high refractive index) are alternately laminated reflects light having a specific wavelength due to constructive interference between a plurality of the layers of low refractive index and the layers of high refractive index. Therefore, the P-polarized light reflection film 10B shown in FIGS. 5 and 6 reflects P-polarized light in the vertical direction and transmits P-polarized light in the horizontal direction in FIG. 6.

It is preferable that the dielectric multi-layer film used in the HUD system according to the embodiment of the present invention includes the above-described three wavelengths of $\lambda_B$, $\lambda_G$, and $\lambda_R$ as the selective reflection center wavelength at a light incidence angle of 60°.

In the dielectric multi-layer film, the selective reflection center wavelength and the reflectivity can be adjusted by a difference between a refractive index of the layer of low refractive index and a refractive index in the layer of high refractive index, a thickness, the number of lamination, and the like. In the example shown in FIG. 5, mainly, reflection having selective reflection center wavelength $\lambda_R$ at a light incidence angle of 60° is realized by the first laminated portion 13R, reflection having selective reflection center wavelength $\lambda_G$ at a light incidence angle of 60° is realized by the second laminated portion 13G, and reflection having selective reflection center wavelength $\lambda_B$ at a light incidence angle of 60° is realized by the third laminated portion 13B.

In the dielectric multi-layer film, the reflection peak having the selective reflection center wavelength obtained by the above-mentioned method is a peak having a maximum value having a difference of 2% or more from an adjacent minimum value and a half-width of 10 to 200 nm.

As described above, the selective reflection center wavelength and the reflectivity in the dielectric multi-layer film can be adjusted by a difference between a refractive index of the layer of low refractive index and a refractive index in the layer of high refractive index, a thickness, the number of layers, and the like. Specifically, a thickness d of the layer of low refractive index and the layer of high refractive index is set to $d=\lambda/(4\times n)$ based on the wavelength $\lambda$ of light to be reflected and the refractive index n. Accordingly, the selective reflection center wavelength can be adjusted. In addition, the reflectivity can be adjusted to adjust the number of layers because the reflectivity increases as the number of layers of the layers of low refractive index and the layers of high refractive index increases. In addition, the half-width of the reflection peak having this selective reflection center wavelength can be adjusted by the difference between a refractive index of the layer of low refractive index and a refractive index in the layer of high refractive index.

Here, the half-width of the reflection peak having each selective reflection center wavelength depends on a difference between a refractive index of the optically anisotropic layer in the slow axis direction and a refractive index of the optically isotropic layer, and the larger the difference between the refractive indices is, the greater the half-width is. In addition, in a case where a reflection peak having a low reflectivity is present at a near wavelength, interference occurs, and a phenomenon in which the reflection peak becomes too strong or too weak occurs. From the viewpoint of increasing the transmittance while improving the brightness of the display image by appropriately adjusting the half-width of the reflection peak having each selective reflection center wavelength, and from the viewpoint of reducing the influence of interference with an adjacent reflection peak, the difference between the refractive index in the slow axis direction of the optically anisotropic layer and the refractive index of the optically isotropic layer is preferably 0.03 to 0.20, more preferably 0.05 to 0.14, and still more preferably 0.05 to 0.10.

In addition, it is preferable that the dielectric multi-layer film includes a light reflection layer having $\Delta_B$ described above, a light reflection layer having $\lambda_G$ described above, and a light reflection layer having $\lambda_R$ described above as selective reflection center wavelengths at a light incidence angle of 60°, and these light reflection layers are in contact with each other. For example, in an example shown in FIG. 5, the first laminated portion 13R having a selective reflection center wavelength $\lambda_R$ at a light incidence angle of 60° and the second laminated portion 13G having a selective reflection center wavelength $\lambda_G$ at a light incidence angle of 60° are mutually contacted, and the second laminated portion 13G having a selective reflection center wavelength $\lambda_G$; at a light incidence angle of 60° and the third laminated portion 13B having a selective reflection center wavelength $\lambda_B$ at a light incidence angle of 60° are mutually contacted. The first laminated portion 13R, the second laminated portion 13G, and the third laminated portion 13B are light reflection layers constituting a dielectric multi-layer film (selective reflection layer) used in the HUD system according to the embodiment of the present invention.

Although not shown in FIG. 5, in addition to the three laminated portions (13R, 13G, and 13B), a selective reflection layer (hereinafter, referred to as a light reflection layer UV) having a selective reflection center wavelength of 300 nm or more and less than 400 nm at a light incidence angle of 60°, which is formed by laminating an optically anisotropic layer and an optically isotropic layer, is preferably included from the viewpoint of suppressing the reflection tint.

By providing the light reflection layer UV, in the case of a configuration of a windshield glass including a cholesteric liquid crystal layer and a retardation layer, which have been described above, it is possible to suppress a tint (particularly, a yellow tint) which is confirmed in a case where the windshield glass is observed under external light.

In a case where the light reflection layers having respective selective reflection center wavelength at a light incidence angle of 60° are spaced from each other, a film thickness between the layers is thick, and it is difficult to obtain the effect of interference of light reflected by each of the light reflection layers. On the other hand, by adopting a configuration in which the light reflection layers are in contact with each other, the half-width of the reflection peak having each selective reflection center wavelength can be narrowed because of the effect of interference of light reflected by each of the light reflection layers.

The P-polarized light reflection film may have a thin film-shape, a sheet-shape, or the like. The P-polarized light reflection film may have a roll-shape as a thin film before used for the windshield glass.

As a material and a method for producing the dielectric multi-layer film, for example, those described in JP1997-506837A (JP-H09-506837A) can be used. Specifically, in a case of performing a process under conditions selected in order to obtain the relationship between refractive indices, the dielectric multi-layer film can be formed by widely using various materials. Usually, a first material is required to have a refractive index different from a second material, in a selected direction. The difference in refractive indices can be achieved by various methods including stretching during film formation or after film formation, extrusion molding, and coating. Furthermore, two materials preferably have similar rheologic properties (for example, melt viscosity) so that the two materials can be coextruded.

Examples of the materials particularly suitably used in the dielectric multi-layer film include, as a material of the optically anisotropic layer, polyethylene naphthalate (PEN) and polyethylene terephthalate (PET), and include, as a material of the optically isotropic layer, PEN, PET, and a polymethyl methacrylate resin (PMMA) (which are isotropically adjusted).

As described above, the P-polarized light reflection film (dielectric multi-layer film) used in the HUD system according to the embodiment of the present invention preferably has three laminated portions in which the optically anisotropic layer and the optically isotropic layer have different thicknesses in order to have the above-described three wavelengths of $\lambda_B$, $\lambda_G$, and $\lambda_R$ as selective reflection center wavelengths at a light incidence angle of 60°. In the present invention, each of the three laminated portions may be formed by the above-described stretching, extrusion molding, and the like, and the laminated portions may be then bonded to each other to produce a P-polarized light reflection film (dielectric multi-layer film). Alternatively, the thickness may be adjusted before the process so that the three laminated portions having different thicknesses are formed, thereby integrally forming the three laminated portions by stretching, extrusion molding, and the like.

The thickness of the dielectric multi-layer film is preferably 2.0 to 50 μm and more preferably 8.0 to 30 μm.

The P-polarized light reflection film including a dielectric multi-layer film has a selective reflection layer (dielectric multi-layer film) formed by laminating an optically anisotropic layer and an optically isotropic layer. The P-polarized light reflection film may be configured to include a retardation layer, a polarization conversion layer, a support, an adhesive layer, and the like in addition to the dielectric multi-layer film.

As the retardation layer, the polarization conversion layer, the support (transparent substrate), and the adhesive layer, which are used in the P-polarized light reflection film, the description of the retardation layer, the polarization conversion layer, the transparent substrate (support), and the adhesive layer which are used in the P-polarized light reflection film including the cholesteric liquid crystal layer described above can be applied.

Hereinafter, among the constituent elements of the windshield glass, the glass plate (laminated glass), the interlayer, and the heat seal layer (adhesive layer) will be sequentially described as constituent elements other than the above-described P-polarized light reflection film.

[2] Laminated Glass

The windshield glass may have a laminated glass configuration. The windshield glass used in the HUD system according to the embodiment of the present invention is a laminated glass, and preferably includes the P-polarized light reflection film described above between a first glass plate and a second glass plate.

The windshield glass may have a configuration in which the P-polarized light reflection film is arranged between the first glass plate and the second glass plate. However, the windshield glass preferably has a configuration in which an interlayer film (interlayer film sheet) is provided on at least one of between the first glass plate and the P-polarized light reflection film, or between the P-polarized light reflection film and the second glass plate.

In the windshield glass, as an example, as shown in FIGS. 1 to 3, the first glass plate 30 is arranged on a side (outside the vehicle) opposite to a side where a video displayed by the HUD system is seen, and the second glass plate 28 is arranged on the side where the image is seen (inside the vehicle). In the windshield glass used in HUD system according to the embodiment of the present invention, the term "first" and "second" in the first glass plate and the second glass plate have no technical meanings, and are provided for convenience in order to distinguish two glass plates. Therefore, the second glass plate may be arranged outside the vehicle and the first glass plate may be arranged inside the vehicle.

As glass plates such as the first glass plate and the second glass plate, glass plates generally used in the windshield glass can be used. For example, a glass plate having a visible light transmittance of 80% or less such as 73% or 76%, such as green glass having high heat shielding properties, may be used. Even in a case where a glass plate having a low visible light transmittance is used as described above, a windshield glass having a visible light transmittance of 70% or more in a position of the P-polarized light reflection film can be produced by using the P-polarized light reflection film described above.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

The windshield glass including the laminated glass structure can be manufactured by a usual method of producing a laminated glass.

In general, the laminated glass can be produced by a method of interposing the interlayer film for a laminated glass between two glass plates, repeating a heating treatment and a pressurizing treatment (treatment using rubber rollers, or the like) several times, and finally performing the heating treatment under a pressurizing condition by using an autoclave.

As an example, the windshield glass having the laminated glass configuration including the P-polarized light reflection film and the interlayer film may be produced by the above-described production method of a laminated glass after the P-polarized light reflection film is formed on a surface of the glass plate, or may be produced by the above-described production method of a laminated glass using the interlayer film for the laminated glass including the above-described P-polarized light reflection film.

In a case where the P-polarized light reflection film is formed on a surface of a glass plate, the glass plate on which the P-polarized light reflection film is provided may be either the first glass plate or the second glass plate. In this case, the P-polarized light reflection film may be bonded to a glass plate with an adhesive (heat seal layer), for example.

[3] Interlayer Film

The interlayer film 36 prevents the glass from being broken and scattering in a vehicle in the event of an accident.

With the interlayer film 36, in the example shown in FIGS. 1 to 3, the P-polarized light reflection film 10 is bonded to the first glass plate 30, in the example shown in FIG. 4, the P-polarized light reflection film 10A is bonded to the first glass plate 30, and in the example shown in FIG. 5, the P-polarized light reflection film 10B is bonded to the second glass plate 28 and the first glass plate 30.

As the interlayer film (interlayer film sheet), any interlayer film usually used as an interlayer film (interlayer) in the laminated glass can be used. For example, a resin film including a resin selected from polyvinylbutyral (PVB), an ethylene-vinyl acetate copolymer, and a chlorine-containing resin can be used. The resin is preferably a main component of the interlayer film. The main component refers to a component occupying 50% by mass or more of the interlayer film.

Among the resins, at least one of polyvinylbutyral or an ethylene-vinyl acetate copolymer are preferable, and polyvinylbutyral is more preferable. The resin is preferably a synthetic resin.

Polyvinylbutyral can be obtained by acetalizing polyvinyl alcohol with butyl aldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has excellent moldability, and the rigidity of the resin film does not become too large. Thus, an excellent workability is achieved. A more preferable lower limit thereof is 500 and a more preferable upper limit is 2,000.

In addition, a thickness of the interlayer film 36 is not limited, and the thickness depending on the forming materials or the like may be set in the same manner as the interlayer film of the normal windshield glass.

In FIGS. 1 to 3, the heat seal layer 38 is provided between the P-polarized light reflection film 10 and the second glass plate 28 in the windshield glass 24, and the P-polarized light reflection film 10 and the first glass plate 30 are attached to each other via the interlayer film 36, but the configuration of the windshield glass 24 is not limited thereto. That is, a configuration may be adopted in which the heat seal layer may be provided between the P-polarized light reflection film 10 and the first glass plate 30, and an interlayer film is provided between the P-polarized light reflection film 10 and the second glass plate 28.

In addition, the windshield glass 24 may not be configured to include the interlayer film 36, and may be configured to use the heat seal layer 38 to attach the P-polarized light reflection film 10 to the second glass plate 28, and attach the P-polarized light reflection film 10 to the first glass plate 30.

The description of this paragraph regarding the heat seal layer 38 and the interlayer film 36 is also applied to FIGS. 4 and 5.

(Interlayer Film Including P-Polarized Light Reflection Film)

The interlayer film for the laminated glass including the P-polarized light reflection films can be formed with the P-polarized light reflection films being bonded onto a surface of the above-described interlayer film. Alternatively, the P-polarized light reflection film may be formed to be sandwiched between the two interlayer films described above. The two interlayer films may be the same as each other or different from each other, and the same interlayer films are preferable.

A normal bonding method can be used to bond the P-polarized light reflection film to the interlayer film, and a laminating process is preferably used. It is preferable that the laminating process is performed under heating and pressurizing conditions to some extent such that the laminate (P-polarized light reflection film) and the interlayer film are not peeled off from each other after processed.

In order to stably perform the laminating, a film surface temperature of a side on which the interlayer film is bonded is preferably 50° C. to 130° C. and more preferably 70° C. to 100° C.

The pressurization is preferably performed at the time of laminating. The pressurizing condition is not limited, but is preferably lower than 2.0 kg/cm$^2$ (less than 196 kPa), more preferably 0.5 to 1.8 kg/cm$^2$ (49 kPa to 176 kPa), and still more preferably 0.5 to 1.5 kg/cm$^2$ (49 kPa to 147 kPa).

In a case where the P-polarized light reflection film includes a support (transparent substrate), the support may be peeled off at the same time as laminating, immediately after laminating, or immediately before laminating. That is, the P-polarized light reflection film attached to the interlayer film obtained after laminating may not have the support.

An example of a method of producing an interlayer film including the P-polarized light reflection film includes (1) a first step of bonding the P-polarized light reflection film to a surface of a first interlayer film to obtain a first laminate, and (2) a second step of bonding a second interlayer film on a surface opposite to the surface to which the first interlayer film of the P-polarized light reflection film in the first laminate is bonded.

For example, in the first step, the P-polarized light reflection film and the first interlayer film are bonded to each other so that the support and the first interlayer film do not face each other. Next, the support is peeled off from the P-polarized light reflection film. Furthermore, in the second step, the second interlayer film is bonded on the surface from which the support has been peeled off. As a result, it possible to produce the interlayer film including the P-polarized light reflection film having no support. In addition, the interlayer film including this P-polarized light reflection film can be used to produce the laminated glass in which the P-polarized light reflection film does not have the support.

In order to stably peel the support without breakage or other damage, the temperature of the support in a case where the support is peeled off from the P-polarized light reflection film is preferably 40° C. or higher, and more preferably 40° C. to 60° C.

[4] Heat Seal Layer (Adhesive Layer)

The heat seal layer (adhesive layer) 38 is, for example, a layer consisting of a coating-type adhesive. In the example shown in FIG. 4, the P-polarized light reflection film 10A is attached to the second glass plate 28 via the heat seal layer 38. In the windshield glass used in the present invention, the P-polarized light reflection film 10A may be attached to the second glass plate 28 via the interlayer film instead of the heat seal layer 38. In addition, in a case where the P-polarized light reflection film 10A is smaller than the interlayer film 36 via which the first glass plate 30 and the P-polarized light reflection film 10A are attached, the P-polarized light reflection film 10A to the second glass plate 28 may be attached via the interlayer film 36.

The heat seal layer 38 is not limited as long as the heat seal layer 38 can secure the transparency required for the windshield glass 24 and can attach the P-polarized light reflection film 10 to the glass with the necessary adhesive strength, and various normal coating-type adhesives are available. The heat seal layer 38 may be the same as the interlayer film 36 such as PVB. In addition to this, as described later, adhesives such as an acrylate-based adhesive can also be used for the heat seal layer 38.

The heat seal layer 38 may be formed of an adhesive.

From the viewpoint of the curing-type, adhesives are classified into hot-melt adhesives, thermosetting adhesives, photocuring adhesives, reaction curing adhesives, and pressure-sensitive adhesives requiring no curing. In addition, as the adhesive, any type of compounds each selected from acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, polyvinylbutyral-based, and the like as a material, can be used.

From viewpoints of workability and productivity, a photocuring method is preferable as a curing method, and from viewpoints of optical transparency and heat resistance, a compound selected from the acrylate-based, urethane acrylate-based, epoxy acrylate-based, and the like as a material, are preferably used.

The heat seal layer 38 may be formed by using a highly transparent adhesive transfer tape (OCA tape). A commercially available product for an image display device, in particular, a commercially available product for a surface of an image display portion of an image display device may be used as the highly transparent adhesive transfer tape. Examples of commercially available products include pressure sensitive adhesive sheets (trade name: PD-S1 and the like) manufactured by Panac Co., Ltd., and pressure sensitive adhesive sheets of MHM (trade name) series manufactured by Nichiei Kako Co., Ltd.

The thickness of the heat seal layer 38 is also not limited. Therefore, depending on the material for forming the heat seal layer 38, the thickness at which sufficient adhesive strength can be obtained may be appropriately set.

Here, in a case where the heat seal layer 38 is excessively thick, the P-polarized light reflection film 10 may not be attached to the second glass plate 28 or the first glass plate 30 while the planarity is sufficiently maintained. In consideration of this point, the thickness of the heat seal layer 38 is preferably 0.1 to 800 μm, and more preferably 0.5 to 400 μm.

The present invention is basically configured as described above. Although the virtual image display apparatus and the HUD system according to the embodiment of the present invention has been described in detail hereinbefore, the present invention is not limited to the embodiment described above, and it is evident that various improvements or changes may be made without departing from the gist of the present invention.

EXAMPLES

Hereinafter, the present invention will be described in more detail based on Examples. The materials, amounts used, ratios, treatment details, treatment procedures, and the like shown in the Examples below can be changed as appropriate without departing from the gist of the present invention. Accordingly, the scope of the present invention is not limited to the following specific examples.

"Part" and "%" that represent compositions in the following Examples are based on the mass unless particularly otherwise described. In addition, the room temperature means "25° C.".

<Preparation of Coating Liquid>

(1) Cholesteric Liquid Crystal Layer-Forming Coating Liquid

Regarding a plurality of cholesteric liquid crystal layer-forming coating liquid for forming cholesteric liquid crystal layers (B1, G1, R1) each of which has a selective reflection center wavelength as a desired wavelength illustrated in Table 1 below, the following components were mixed to prepare each cholesteric liquid crystal layer-forming coating liquid having the following composition.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent Paliocolor LC 756 (trade name, manufactured by BASFSE) | adjusted in accordance with the desired reflection wavelength |
| Polymerization initiator IRGACURE OXE01 (trade name, manufactured by BASFSE) | 1.0 part by mass |
| Solvent (methyl ethyl ketone) | the amount of a solute concentration of 20% by mass |

Mixture 1:

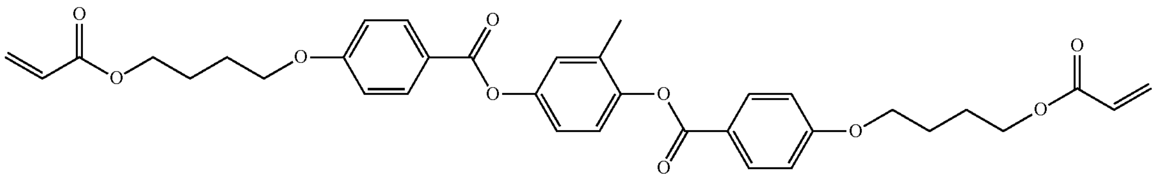

84%

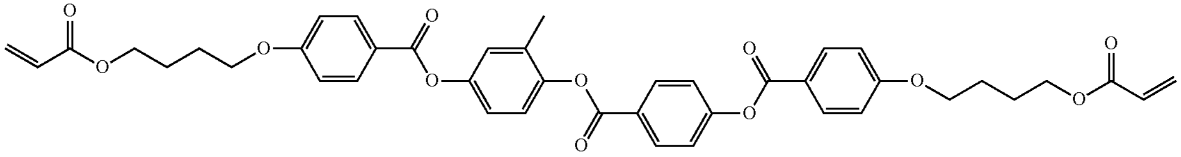

14%

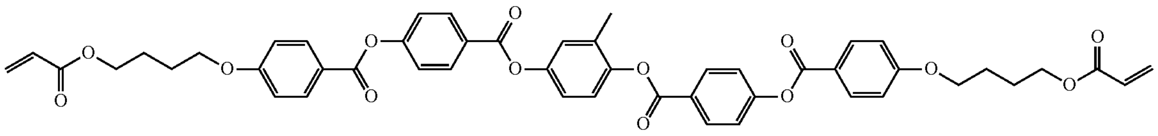

2%

Nurmerical values represent masses.

-continued
| | |
|---|---|
| Alignment control agent 1: | 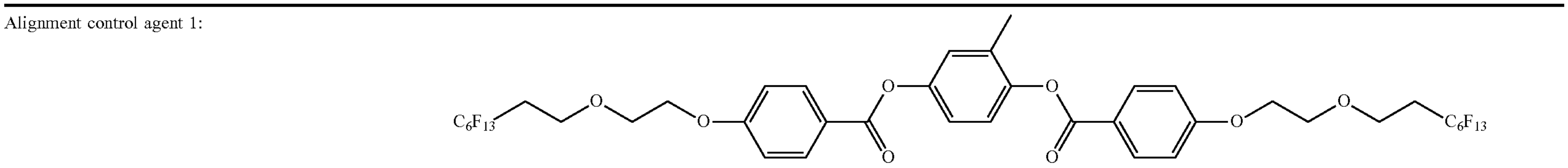 |
| Alignment control agent 2: | 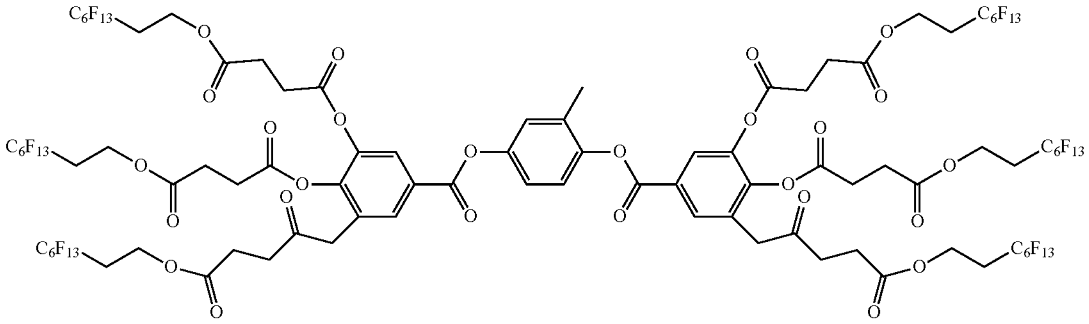 |

(Reflection Characteristics of Cholesteric Liquid Crystal Layer)

Each cholesteric liquid crystal layer (layer cured by a polymerization reaction) of a single layer having a film thickness of about 3 μm was produced on a temporary support in the same manner as in the production of the cholesteric liquid crystal layer which will be described below, using each cholesteric liquid crystal layer-forming coating liquid prepared as described above. It was confirmed that each produced cholesteric liquid crystal layers was a dextrorotatory circularly polarized light reflection layer, and the selective reflection center wavelength (center wavelengths) as a wavelength illustrated in Table 1.

The selective reflection center wavelength shown in Table 1 is a value measured by [Evaluation α] Measurement of reflection spectrum of selective reflection layer described later.

TABLE 1

| Cholesteric liquid crystal layer | B1 | G1 | R1 |
|---|---|---|---|
| Selective reflection center wavelength (60°) | 380 nm | 570 nm | 690 nm |
| Selective reflection center wavelength (5°) | 450 nm | 680 nm | 820 nm |

(2) Retardation Layer-Forming Coating Liquid

The following components were mixed to have the following compositional ratio, thereby preparing a retardation layer-forming coating liquid.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.01 parts by mass |
| Polymerization initiator IRGACURE OXE01 (trade name, manufactured by BASF SE) | 1.0 part by mass |
| Solvent (methyl ethyl ketone) | the amount of a solute concentration of 20% by mass |

(3) Polarization Conversion Layer-Forming Coating Liquid

The following components were mixed to have the following compositional ratio, thereby preparing a polarization conversion layer-forming coating liquid.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Dextrorotatory chiral agent Paliocolor LC 756 (trade name, manufactured by BASF SE) | 0.26 parts by mass |
| Polymerization initiator IRGACURE OXE01 (trade name, manufactured by BASF SE) | 1.0 part by mass |
| Solvent (methyl ethyl ketone) | the amount of a solute concentration of 20% by mass |

(Polarization Properties of Polarization Conversion Layer)

The polarization conversion layer obtained from polarization conversion layer-forming coating liquid prepared as described above had a selective reflection center wavelength λ of 10,000 nm at a light incidence angle of 5°.

The selective reflection center wavelength λ at a light incidence angle of 5° was measured with fourier transform infrared spectroscopy (FTIR, manufactured by PerkinElmer, Inc., trade name: Spectrum Two) by producing a single cholesteric liquid crystal layer having a film thickness of about 3 μm on a temporary support using the polarization conversion layer-forming coating liquid prepared as described above.

In addition, in the cholesteric liquid crystal layer, the film thickness d of the helical structure is represented by "the pitch P×the number of pitches of the helical structure". As described above, the pitch P of the helical structure means the thickness of the layer in a case where the helically aligned liquid crystal compound rotates by 360°. In addition, in the cholesteric liquid crystal layer, the selective reflection center wavelength λ at a light incidence angle of 5° coincides with "the pitch P of the helical structure×the average refractive index n in the plane" (λ=P×n). Therefore, the pitch P of the helical structure is "the selective reflection center wavelength λ at a light incidence angle of 5°/the average refractive index n in the plane" (P=λ/n).

EXAMPLES

[1] Production of P-Polarized Light Reflection Film

<1-1> Production of Selective Reflection Layer Consisting of Cholesteric Liquid Crystal Layer (1) Production of Saponified Cellulose Acylate Film A cellulose acylate film having a thickness of 40 μm was produced in the same manner as described in the production of the cellulose acylate film described in Example 20 of WO2014/112575, except that a core layer cellulose acylate dope obtained by blending 3 parts by mass of an ultraviolet absorber UV-531 (trade name) manufactured by Fujian Disheng Technology Co., Ltd. with 100 parts by mass of cellulose acetate (not including the ester oligomer A) was used as the core layer cellulose acylate dope instead of 2 parts by mass of the ultraviolet absorber described in paragraph of WO2014/112575A.

The produced cellulose acylate film passed through a dielectric heating roll having a temperature of 60° C., and a temperature at the film surface was increased to 40° C. Thereafter, one side of the film was coated with an alkaline solution in the composition provided as below to have a coating amount of 14 mL/$m^2$ by using a bar coater and was allowed to stay under a steam-type far infrared heater (manufactured by Noritake Co., Ltd.) heated to 110° C. for 10 seconds.

Next, pure water was applied at 3 mL/$m^2$ by using a bar coater in the same manner.

Next, washing with water using a fountain coater and dewatering using an air knife were repeated three times, staying in a drying zone at 70° C. was performed for 5 seconds, and drying was performed to produce a saponified cellulose acylate film (transparent support).

The in-plane phase difference of the saponified cellulose acylate film was measured by AxoScan (manufactured by Axometrics, Inc., trade name), and the measurement result was 1 nm.

| Composition of Alkaline solution | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

(2) Formation of Alignment Film

The saponified surface of the saponified cellulose acylate film (transparent support) is coated with an alignment film-forming coating liquid having a composition illustrated below by a wire bar coater at 24 mL/$m^2$, and dried with hot air at 100° C. for 120 seconds to form an alignment film.

| Composition of alignment film-forming coating liquid | |
|---|---|
| Modified polyvinyl alcohol shown below | 28 parts by mass |
| Citric acid ester (trade name: AS3, manufactured by Sankyo Chemical Co., Ltd.) | 1.2 parts by mass |
| Photoinitiator (trade name: IRGACURE 2959, manufactured by BASF SE) | 0.84 parts by mass |
| Glutaraldehyde | 2.8 parts by mass |
| Water | 699 parts by mass |
| Methanol | 226 parts by mass |

Modified polyvinyl alcohol:

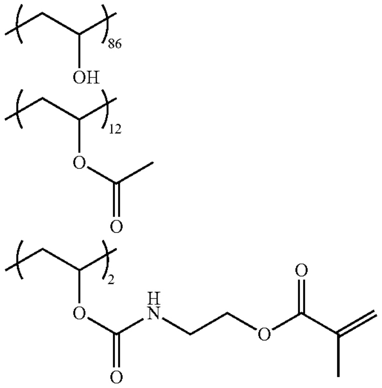

(3) Production of Laminate of Retardation Layer, Selective Reflection Layer, and Polarization Conversion Layer (3-1) Production of Retardation Layer The cellulose acylate film on which the alignment film was formed was used as a support (transparent substrate).

A surface of the alignment film in support was subjected to a rubbing treatment in a direction rotated clockwise by 45° with respect to the long side direction of the support. Specifically, the treatment was performed using rayon cloth under the conditions of pressing force: 0.1 kgf (0.98 N), rotation speed: 1,000 revolutions per minute (rpm), transportation speed: 10 m/min, and the number of times: 1 round trip.

The retardation layer-forming coating liquid prepared as described above was applied to the rubbed surface of the alignment film on the support by a wire bar, and then dried.

Next, the coated result was placed on a hot plate at 50° C. and irradiated with ultraviolet light for 6 seconds by an electrodeless lamp "D bulb" (60 mW/$cm^2$) manufactured by Fusion UV Systems Inc. in an environment with an oxygen concentration of 1,000 ppm or less, and the liquid crystalline phase was immobilized. As a result, a retardation layer having a desired front phase difference, that is, a thickness adjusted to obtain a desired retardation was obtained.

The retardation of the produced retardation layer was measured with AxoScan (manufactured by Axometrics, Inc., trade name) and found to be 126 nm.

(3-2) Production of Selective Reflection Layer

The cholesteric liquid crystal layer (B1)-forming coating liquid prepared as described above is applied to the surface of the obtained retardation layer at room temperature using a wire bar such that the film thickness after drying was the film thickness described in Table 3 below, and a coating layer was obtained.

The coating layer was dried at room temperature for 30 seconds and heated in an atmosphere of 85° C. for 2 minutes. Thereafter, in an environment with an oxygen concentration of 1,000 ppm or less, a D bulb (60 mW/$cm^2$ lamp) manufactured by Fusion Co., Ltd. was used for irradiation with ultraviolet light at 60° C. and 60% output for 6 to 12 seconds to immobilize a cholesteric liquid crystalline phase, thereby obtaining a cholesteric liquid crystal layer B1 having the film thickness shown in Table 3 below.

Next, the cholesteric liquid crystal layer G1 and the cholesteric liquid crystal layer R1 were laminated in this order on the surfaces of the obtained cholesteric liquid crystal layer B1 to have the film thicknesses shown in Table 3 below, and thereby obtaining a laminate in which three cholesteric liquid crystal layers were laminated on the retardation layer.

Each of the cholesteric liquid crystal layers G1 and R1 was produced layer by layer in the same manner as in the production of the cholesteric liquid crystal layer B1, except that the corresponding cholesteric liquid crystal layer (G1 and R1)-forming coating liquid was used instead of the cholesteric liquid crystal layer (B1)-forming coating liquid.

(3-3) Production of Polarization Conversion Layer

Next, the polarization conversion layer-forming coating liquid prepared as described above is applied on the outermost surface of the obtained cholesteric liquid crystal layer in the obtained laminate to have a film thickness of 1.7 μm, thereby forming a polarization conversion layer (twisted layer). The polarization conversion layer was produced in the same manner as in the production of the cholesteric liquid crystal layer described above, except that the polarization conversion layer-forming coating liquid was used instead of the cholesteric liquid crystal layer-forming coating liquid.

The obtained polarization conversion layer was a twisted layer having a selective reflection center wavelength λ of 10,000 nm and the number of pitches of 0.265.

In this manner, a laminate (this laminate is also referred to as a "P-polarized light reflection film") obtained by laminating the retardation layer, the selective reflection layer, and the polarization conversion layer was laminated on the support (transparent substrate) in this order was produced.

<1-2> Production of P-Polarized Light Reflection Film Consisting of Selective Reflection Layer (Dielectric Multi-Layer Film)

A P-polarized light reflection film consisting of a selective reflection layer (dielectric multi-layer film) was produced as follows, based on a method described in JP1997-506837A (JP-H09-506837A).

Each of 2,6-Polyethylene naphthalate (PEN) and copolyester (coPEN) of 70 mol % of naphthalate and 30 mol % of terephthalate was synthesized in a standard polyester resin synthesis oven using ethylene glycol as a diol.

A monolayer film of obtained PEN and coPEN was extrusion-molded, stretched at about 150° C. and a stretching ratio of 5:1, and heat-treated at about 230° C. for 30 seconds. As a result of this stretching heat treatment, it was confirmed that a refractive index with respect to the slow axis (alignment axis) of the PEN film was about 1.86, a refractive index with respect to the transverse axis was 1.64, coPEN film was isotropic, and a refractive index of the coPEN film was about 1.64.

Next, by adjusting the stretching ratio, it was confirmed that a refractive index with respect to the slow axis of the PEN film was about 1.71, a refractive index with respect to the transverse axis was 1.64, coPEN film was isotropic, and a refractive index of the coPEN film was about 1.64. That is, the difference Δn between the refractive index in the slow axis direction of the PEN film as the optically anisotropic layer and the refractive index of the coPEN film as the optically isotropic layer was 0.07.

Subsequently, a laminate obtained by co-extruding PEN and coPEN was stretched and heat-treated to produce a P-polarized light reflection film. The thickness of this P-polarized light reflection film was about 18.6 μm, and the P-polarized light reflection layers (1) to (6) shown in Table 2 below were provided in this order. Each P-polarized light reflection layer is a layer having each 16 layers of PEN and coPEN having film thicknesses shown in the column of each P-polarized light reflection layer alternately.

Specifically, each laminate before stretching corresponding to the P-polarized light reflection layers (1) to (6) in Table 2 below was produced using an 32-slot feed block equipped with a standard extrusion die under the same conditions as those described in Example 1 of JP1997-506837A (JP-H9-506837A) by adjusting extruding speeds of PEN and coPEN to have an optical ¼ wavelength thickness at a desired selective reflection center wavelength (5°), then the laminate obtained by laminating all of these is uniaxially stretched at about 150° C. and a stretching ratio of 5:1, and the stretched laminate is placed in an air oven and heat-treated at about 230° C. for 30 seconds, thereby producing a P-polarized light reflection film.

The selective reflection center wavelength shown in Table 2 is a value measured by [Evaluation α] Measurement of reflection spectrum of selective reflection layer described later.

TABLE 2

| | P-polarized light reflection layer | | | | | |
|---|---|---|---|---|---|---|
| | (1) | (2) | (3) | (4) | (5) | (6) |
| Selective reflection center wavelength (60°) | 385 nm | 470 nm | 556 nm | 600 nm | 642 nm | 684 nm |
| Selective reflection center wavelength (5°) | 450 nm | 550 nm | 650 nm | 700 nm | 750 nm | 800 nm |
| PEN film thickness | 65.8 nm | 80.4 nm | 95.0 nm | 102.3 nm | 109.6 nm | 117.0 nm |
| coPEN film thickness | 68.6 nm | 83.8 nm | 99.1 nm | 106.7 nm | 114.3 nm | 122.0 nm |

[2] Production of Windshield Glass

<2-1> Production of Windshield Glass Having Selective Reflection Layer Consisting of Cholesteric Liquid Crystal Layer Using the laminate obtained by laminating the support (transparent substrate), the retardation layer, the selective reflection layer, and the polarization conversion layer in this order, a laminate in which the first glass plate, the interlayer film, the polarization conversion layer, the selective reflection layer (cholesteric liquid crystal layer), the retardation layer, the support (transparent substrate), the heat seal layer, and the second glass plate were laminated in this order was produced.

In the heat seal layer in the laminate, a heat seal layer-forming coating liquid was applied to the support (transparent substrate) side of the selective reflection layer consisting of a cholesteric liquid crystal layer using a wire bar, dried, and heated at 50° C. for 1 minute to form a heat seal layer having a thickness of 1 μm.

The obtained laminate was held at 90° C., 10 kPa (0.1 atm) for 1 hour, and then heated in an autoclave (manufactured by Kurihara Seisakusho Co., Ltd.) at 115° C., 1.3 MPa (13 atm) for 20 minutes to remove air bubbles, thereby obtaining a windshield glass A having a selective reflection layer consisting of a cholesteric liquid crystal layer.

<2-2> Production of Windshield Glass Having Selective Reflection Layer Consisting of Dielectric Multi-Layer Film Using the P-polarized light reflection film consisting of dielectric multi-layer film produced as described above, a laminate was produced by laminating the second glass plate, the interlayer film, the selective reflection layer (dielectric multi-layer film), the interlayer film, and the first glass plate in this order. The obtained laminate was held at 90° C., 10 kPa (0.1 atm) for 1 hour, and then heated in an autoclave (manufactured by Kurihara Seisakusho Co., Ltd.) at 115° C., 1.3 MPa (13 atm) for 20 minutes to remove air bubbles, thereby obtaining a windshield glass B.

In the P-polarized light reflection film, lamination was performed such that the P-polarized light reflection layer (1) was on the side of the second glass plate and the P-polarized light reflection layer (6) was on the side of the first glass plate.

The windshield glass was used by cutting each layer into the same shape as the first glass plate and the second glass plate.

The glass plate, the interlayer film, and the heat seal layer-forming coating liquid, which are used for producing the windshield glass are as follows.

As the first glass plate and the second glass plate, a glass plate (manufactured by Central Glass Co., Ltd., FL2, visible light transmittance of 90%) having a length of 120 mm×a width of 100 mm, and a thickness of 2 mm was used.

In addition, a polyvinylbutyral (PVB) film having a thickness of 0.38 mm manufactured by Sekisui Chemical Co., Ltd. was used as an interlayer film.

In addition, in the production of the heat seal layer, the heat seal layer-forming coating liquid prepared by mixing the following components to have the following compositional ratio, was used.

| (Heat seal layer-forming coating liquid) | |
|---|---|
| PVB sheet piece (manufactured by Sekisui Chemical Co., Ltd., ESLEK film) | 5.0 parts by mass |
| Methanol | 90.25 parts by mass |
| Butanol | 4.75 parts by mass |

The following Table 3 collectively shows the configuration of the selective reflection layer in windshield glasses A and B. In the design of the HUD system described later, the windshield glass was disposed such that the image display light was incident on the second glass plate side in each windshield glass, and used.

TABLE 3

| Windshield glass | Selective reflection layer | | |
|---|---|---|---|
| | Material | Selective reflection center wavelength (60°) | Film thickness |
| A | Cholesteric liquid crystal layer | B1: 380 nm<br>G1: 570 nm<br>R1: 690 nm | B1: 0.30 μm<br>G1: 0.54 μm<br>R1: 0.36 μm |
| B | Dielectric multi-layer film by PEN and coPEN | (1): 385 nm<br>(2): 470 nm<br>(3): 556 nm<br>(4): 600 nm<br>(5): 642 nm<br>(6): 684 nm | (1): 2.2 μm<br>(2): 2.6 μm<br>(3): 3.1 μm<br>(4): 3.3 μm<br>(5): 3.6 μm<br>(6): 3.8 μm |

[3] Production of Positive Diffractive Reflective Element

<3-1> Production of Reflective Type Liquid Crystal Diffraction Element

An alignment film was formed on the undercoat layer formed on the support, and the alignment film was irradiated with laser light beam. Then, an interference pattern (surface periodic structure) was controlled by changing an intersecting angle between the two laser light beams, and the alignment film was cured. By forming a liquid crystal layer on the obtained photo-alignment film, a reflective type liquid crystal diffraction element was produced.

Specifically, a reflective type liquid crystal diffraction element obtained by laminating the B reflective layer, the G reflective layer, and the R reflective layer in this order with an adhesive (manufactured by Soken Chemical & Engineering Co., Ltd., trade name: SK Dyne 2075) was produced in the same manner as in the production of the reflective type liquid crystal diffraction element described in Example 2 of WO2019/131966A, except that the intersecting angle between the two laser light beams during the exposure of the alignment film with the exposure device shown in FIG. 5 of WO2019/131966A was changed such that desired diffraction and reflection shown in Table 4 below were obtained.

The selective reflection center wavelengths shown in Table 4 are values measured by "[Evaluation α] Measurement of reflection spectrum of selective reflection layer" described later, and the single period means a length over which the optical axis derived from the liquid crystal compound rotates by 180°.

TABLE 4

| | B reflection layer | G reflection layer | R reflection layer |
|---|---|---|---|
| Selective reflection center wavelength (30°) | 450 nm | 530 nm | 635 nm |
| Single period | 0.9 μm | 1.1 μm | 1.3 μm |

The reflective type liquid crystal diffraction element produced as described above has polarization properties in reflection and diffracts and reflects circularly polarized light. Therefore, in the design of the HUD system described later, the reflective type liquid crystal diffraction element was bonded to a quarter-wave plate (manufactured by Teijin Limited, trade name: PURE-ACE WR-S, polycarbonate film, front retardation of 126 nm) on the side of the R reflective layer, disposed such that light from the image display device was incident on the side of the quarter-wave plate, and used as a diffractive reflective element that reflects P-polarized light.

<3-2> Production of Reflective Type Hologram Element

With respect to dichromated gelatin as the photosensitive material, laser light beam is separated into two laser light beams by a beam splitter, information on the amplitude and the phase of the object light is made as an interference pattern (periodic refractive index distribution) with the reference light using the two separated laser light beams, the photosensitive material is cured in a state where the refractive index distribution is made, and a volume type reflective hologram element exhibiting the desired diffraction and reflection shown in Table 5, was produced. In the obtained volume type reflective hologram element, the period of the refractive index distribution on the surface thereof is a diffraction grating.

TABLE 5

| | B reflection layer | G reflection layer | R reflection layer |
|---|---|---|---|
| Selective reflection center wavelength (30°) | 450 nm | 530 nm | 635 nm |
| Single period | 0.9 μm | 1.1 μm | 1.3 μm |

The volume type reflective hologram element produced as described above does not have polarization properties in reflection and diffracts and reflects unpolarized light.

[4] Production of Half-Wave Plate

Two quarter-wave plates (manufactured by Teijin Limited, trade name: PURE-ACE WR-S, polycarbonate film, front retardation of 126 nm) were bonded to each other using an OCA tape (manufactured by Nichiei Kako Co., Ltd., trade name: MHM-UVC15, thickness of 15 μm) to produce a half-wave plate.

In the design of the HUD system described later, the half-wave plate was disposed by being rotated to match the direction of the slow axis such that transmitted light was desired polarized light, and used.

[5] Production of Negative Transmission Type Optical Element

<5-1> Production of Transmission Type Liquid Crystal Diffraction Element

An alignment film was formed on the undercoat layer formed on the support, and the alignment film was irradiated with laser light beam. Then, an interference pattern (surface periodic structure) was controlled by changing an intersecting angle between the two laser light beams, and the alignment film was cured. By forming a liquid crystal layer on the obtained photo-alignment film without twisting the rod-like liquid crystal (without blending a chiral agent), a transmission type liquid crystal diffraction element was produced.

Specifically, the transmission type liquid crystal diffraction element was produced according to the production of the transmission type optically anisotropic member (transmission type liquid crystal diffraction element) described in Example 2 of WO2020/022513A. The length (single period) over which the optical axis derived from the liquid crystal compound rotated by 180° was designed to be about 10 μm in the central portion of the element and about 1 μm in the end portion of the element.

In the design of the HUD system described later, the transmission type liquid crystal diffraction element produced above was disposed such that light from the image display device was incident on the side of the liquid crystal layer, and used.

<5-2> Production of Transmission Type Hologram Element

A volume type transmissive hologram element was produced in the same method as that of <3-2> Production of reflective type hologram element, except that an interference pattern was prepared to be a transmission type. In the obtained volume type reflective hologram element, the period of the refractive index distribution on the surface thereof is a diffraction grating.

<5-3> Concave Lens

A concave lens having a required curvature was produced by a normal method in accordance with the size of the windshield glass, the distance between the windshield glass and the virtual image display apparatus, and other optical members used in the HUD system.

[Design of Head-Up Display System (HUD System)]

The HUD systems No. 101 to 107 and c11 shown in Table 6 were designed using the windshield glass, the positive diffractive reflective element, the half-wave plate, and the negative transmission type optical element, which were produced above, and the following image display device.

The each disposition was performed such that HUD system No. 101 has the configuration shown in FIG. 1, the HUD systems Nos. 102 to 104 have the configuration shown in FIG. 2, and the HUD systems Nos. 105 to 107 have the configuration shown in FIG. 3. The HUD system No. 104 has a configuration in which an interlayer film is disposed instead of the heat seal layer in the configuration shown in FIG. 2. These HUD systems Nos. 101 to 107 are HUD systems provided with the virtual image display apparatus according to the embodiment of the present invention.

On the other hand, the HUD system No. c11 shown in Table 6 is a HUD system designed using the positive diffractive reflective element and the negative transmission type optical element, which were produced above, and the following image display device and glass, and provided with the virtual image display apparatus as comparison. The disposition in HUD system No. c11 was performed to have the same configuration as that in FIG. 3, except that the half-wave plates 5A and 5B were not provided and glass was used instead of the windshield glass 24.

A light field display was used as the image display device.

In addition, as the polarized light of the emitted light of the image display device, linearly polarized light in which the azimuth of the polarized light was rotated by about 10° from S-polarized light was used.

In the HUD systems of Nos. 101 to 107, the arrangement angle and the like were adjusted such that the light incident on the positive diffractive reflective element was S-polarized light having a satisfactory diffraction efficiency and the light incident on the windshield glass was P-polarized light.

The windshield glass of the HUD system of No. c11 or the like is a wedge-shaped glass, and also in a case where S-polarized light is reflected, a linearly polarized light in which the azimuth of the polarized light was rotated by about 10° from S-polarized light described above was used, thereby the HUD system may be designed such that the HUD image can be seen even a little also in a state where the polarizing sunglasses are worn. Therefore, in the HUD system of No. c11, the HUD system as described above was reproduced, and the arrangement angle and the like were adjusted such that linearly polarized light in which the orientation of polarized light was rotated by about 10° with respect to S polarized light was incident on the positive diffractive reflective element and linearly polarized light in which the azimuth of the polarized light was rotated by about 10° from S-polarized light was incident on the glass.

The brightness, the brightness in case of where the polarizing sunglasses are worn, and the chromatic aberration were evaluated by visual observation at a position 1 m away from the windshield glass (corresponding to a positional relationship of the observer D in FIGS. 1 to 3) as an observation point as follows. These results are summarized in Table 6.

[Evaluation α] Measurement of Reflection Spectrum of Selective Reflection Layer

A black polyethylene terephthalate (PET) film (light absorbing body) was bonded to the rear surface of the produced windshield glass on the first glass plate side.

Using a spectrophotometer (manufactured by JASCO Corporation, trade name: V-670), P-polarized light and S-polarized light were respectively incident from the second glass plate of the windshield glass in a direction at a desired angle with respect to the normal direction of the windshield glass surface to measure reflection spectra of the P-polarized light and the S-polarized light in a band of wavelength of 300 to 800 nm. The average value (average reflection spectrum) of the measured reflection spectrum of P-polarized light and the measured reflection spectrum of S-polarized light was obtained.

In the present invention, the selective reflection center wavelength (60°) means a value calculated based on a reflection spectrum measured by incidence of light at an angle of 60° with respect to the normal direction of the windshield glass surface, and the selective reflection center wavelength(5°) means a value calculated based on a reflection spectrum measured by incidence of light at an angle of 5° with respect to the normal direction of the windshield glass surface.

The average value of the reflection spectrum of P-polarized light and the reflection spectrum of S-polarized light has the same meaning as the reflection spectrum in the case where the natural light was incident.

[Evaluation 1] Evaluation of Brightness

An image of white characters on a black ground was displayed by an image display device, and the brightness was evaluated by applying the appearance of the characters visually observed to the following evaluation standard.

—Evaluation Standard (Brightness)—

A: The characters are readable outdoors in fine weather and are readable indoors under indoor lighting.

A⁻: The characters are slightly difficult to read outdoors in fine weather and are readable under indoor lighting.

B: The characters are slightly difficult to read outdoors in fine weather and are slightly difficult to read indoors under indoor lighting.

C: The characters are difficult to read outdoors and slightly difficult to read indoors under indoor lighting.

[Evaluation 2] Evaluation of Brightness in Case of where the Polarizing Sunglasses are Worn White characters on a black ground was displayed by an image display device, and the brightness in a case of wearing the polarizing sunglasses was evaluated by applying the appearance of the characters visually observed in case of where the polarizing sunglasses are worn to the following evaluation standard.

In the present test, the evaluation of “A” to “B” is an acceptable level.

—Evaluation Standard (Brightness in Case of where the Polarizing Sunglasses are Worn)—

A: The characters are readable outdoors in fine weather and are readable indoors under indoor lighting.

$A^-$: The characters are slightly difficult to read outdoors in fine weather and are readable under indoor lighting.

B: The characters are slightly difficult to read outdoors in fine weather and are slightly difficult to read indoors under indoor lighting.

C: The character is not visible outdoors and is not visible under indoor lighting.

[Evaluation 3] Evaluation of Chromatic Aberration

A photograph of a building on a black ground was displayed by an image display device, and a chromatic aberration was evaluated by applying a color shift (that is, a misregistration of red, blue, and green images) visually observed to the following evaluation standard.

In this test, the evaluations “A” and “B” are that the chromatic aberration is excellent and is at a preferable level.

—Evaluation Standard (Chromatic Aberration)—

A: Color shift was hardly recognized.

B: A slight color shift was seen at the end part of the building

C: Color shift was significantly seen.

TABLE 6

| | Positive diffractive reflective element | | Half-wave plate | | Negative | Windshield glass | | Evaluation | | |
|---|---|---|---|---|---|---|---|---|---|---|
| No. | Type | Polarization of reflected light | First | Second | transmission type optical element | Type | P-polarized reflection film | Brightness | Brightness in case of where the polarizing sunglasses are worn | Chromatic aberration |
| 101 | Reflective type liquid crystal diffraction element | Linear polarized light | Present | Absent | Absent | A (cholesteric liquid crystal) | Present | A– | A– | B |
| 102 | Reflective type liquid crystal diffraction element | Linear polarized light | Present | Present | Absent | A (cholesteric liquid crystal) | Present | A | A | B |
| 103 | Reflective type hologram element | Unpolarized light | Present | Present | Absent | A (cholesteric liquid crystal) | Present | B | B | B |
| 104 | Reflective type hologram element | Unpolarized light | Present | Present | Absent | B (dielectric multi-layer film) | Present | B | B | B |
| 105 | Reflective type hologram element | Unpolarized light | Present | Present | Transmission type hologram element | A (cholesteric liquid crystal) | Present | B | B | A |
| 106 | Reflective type hologram element | Unpolarized light | Present | Present | Transmission type liquid crystal diffraction element | A (cholesteric liquid crystal) | Present | B | B | A |
| 107 | Reflective type liquid crystal diffraction element | Linear polarized light | Present | Present | Concave lens | A (cholesteric liquid crystal) | Present | A | A | A |
| c11 | Reflective type hologram element | Unpolarized light | Absent | Absent | Transmission type hologram element | Glass | Absent | C | C | A |

(Notes in Table)

The windshield glass, the positive diffractive reflective element, the half-wave plate, and the negative transmission type optical element were produced as described above.

In the positive diffractive reflective element, the polarization of the reflected light of the reflective type liquid crystal diffraction element is linear polarization because the quarter-wave plates are used to be overlapped.

Among the half-wave plates, the half-wave plate described in the first column is disposed on an optical path that guides projection image light to the projection portion to be positioned between the diffractive reflective element having positive optical power and the windshield glass. On the other hand, the half-wave plate described in the second column is disposed on an optical path that guides projection image light to the projection portion to be positioned between the image display device and the transmission type optical element having negative optical power, or to be positioned the image display device and the positive diffractive reflective element in a case where the negative transmission type optical element is not provided.

From the results in Table 6, the following facts can be seen.

As described in JP2020-56880A, in the virtual image display apparatus in the HUD system No. c11 in which the half-wave plate defined in the present invention was not provided therein and in which the projection image light from the image display device was diffracted by a diffractive reflective element having a positive optical power and the S-polarized image display light was incident into the projection portion, in a case where the virtual image display apparatus was used in combination with a windshield glass provided with a S-polarized light reflection function, the projected characters were difficult to read outdoors and slightly difficult to read under indoor lighting, the projected characters were not visible under both outdoor and indoor lighting in a case where sunglasses are worn, and the brightness was inferior.

On the other hand, in the virtual image display apparatuses of the HUD systems Nos. 101 to 107 in which the half-wave plate defined in the present invention was provided therein and in which the projection image light from the image display device was diffracted by a diffractive reflective element having a positive optical power and the P-polarized image display light was incident into the projection portion, in a case where the virtual image display apparatus was used in combination with a windshield glass provided with a P-polarized light reflection function, the projected characters could be read regardless of whether or not the sunglasses were worn (the evaluation of the brightness in the evaluations 1 and 2 was "A" to "B"), and the virtual image display apparatus of the HUD system No. c11 exhibited excellent brightness.

In addition, the HUD systems Nos. 101 to 107 including the virtual image display apparatus according to the embodiment of the present invention exhibited a satisfactory level also in terms of chromatic aberration.

The present invention has been described with the embodiments thereof, any details of the description of the present invention are not limited unless described otherwise, and it is obvious that the present invention is widely construed without departing from the gist and scope of the present invention described in the accompanying claims.

EXPLANATION OF REFERENCES

1: virtual image display apparatus
2: image display device
3: positive diffractive reflective element
5A, 5B: half-wave plate
7: negative transmission type optical element
10: P-polarized light reflection film
10A: P-polarized light reflection film
10B: P-polarized light reflection film
11: selective reflection layer
12: cholesteric liquid crystal layer
12R: cholesteric liquid crystal layer having selective reflection center wavelengths $\lambda_R$ at light incidence angle of 60°
12G: cholesteric liquid crystal layer having selective reflection center wavelengths $\lambda_G$ at light incidence angle of 60°
12B: cholesteric liquid crystal layer having selective reflection center wavelengths $\lambda_B$ at light incidence angle of 60°
13R: first laminated portion having selective reflection center wavelengths $\lambda_R$ at light incidence angle of 60°
13G: second laminated portion having selective reflection center wavelengths $\lambda_G$ at light incidence angle of 60°
13B: third laminated portion having selective reflection center wavelengths $\lambda_B$ at light incidence angle of 60°
13Ra, 13Ga, 13Ba: optically anisotropic layer
13Rb, 13Gb, 13Bb: optically isotropic layer
14: polarization conversion layer
16: retardation layer
18: transparent substrate
20: head-up display system (HUD system)
24, 24A, 24B: windshield glass
28: second glass plate
30: first glass plate
36: interlayer film
38: adhesive layer (heat seal layer)
D: observer
L: linearly polarized light
P: P-polarized light
S: S-polarized light
$n_{e1}$: refractive index of optically anisotropic layer in slow axis direction
$n_{o1}$: refractive index of optically anisotropic layer in direction orthogonal to slow axis
$n_{o2}$: refractive index of optically isotropic layer

What is claimed is:

1. A virtual image display apparatus that is configured to be mounted in a transportation machine and is configured such that P-polarized image display light is incident into a projection portion, the virtual image display apparatus comprising:

an image display device that emits projection image light;

a diffractive reflective element having positive optical power; and a half-wave plate having a front retardation of 200 nm to 400 nm, wherein the diffractive reflective element and the half-wave plate are provided on an optical path that guides the projection image light to the projection portion, in order from a side of the image display device.

2. The virtual image display apparatus according to claim 1, further comprising:

a half-wave plate having a front retardation of 200 nm to 400 nm, which is provided between the diffractive reflective element having positive optical power and the image display device on the optical path.

3. The virtual image display apparatus according to claim 1, wherein the diffractive reflective element having positive optical power is a reflective type hologram element that is obtained by fixing a photosensitive material and that has a refractive index distribution.

4. The virtual image display apparatus according to claim 1, wherein the diffractive reflective element having positive optical power is a diffractive element that has an alignment film and a liquid crystal layer, that has a liquid crystal alignment pattern according to a periodic pattern of the alignment film, and that has a function of diffracting and reflecting incident light.

5. The virtual image display apparatus according to claim 1, further comprising:

a transmission type optical element having negative optical power, which is provided between the diffractive reflective element having positive optical power and the image display device on the optical path.

6. The virtual image display apparatus according to claim 5, wherein the transmission type optical element having negative optical power is a transmission type hologram element that is obtained by fixing a photosensitive material and that has a refractive index distribution.

7. The virtual image display apparatus according to claim 5, wherein the transmission type optical element having negative optical power is a diffractive element that has an alignment film and a liquid crystal layer, that has a liquid crystal alignment pattern according to a periodic pattern of the alignment film, and that has a function of diffracting and transmitting incident light.

8. The virtual image display apparatus according to claim 5, wherein the transmission type optical element having negative optical power is a lens that refracts the projection image light.

9. The virtual image display apparatus according to claim 1, wherein the image display device is a light field display.

10. A head-up display system comprising:

a windshield glass that has a first glass plate, a P-polarized light reflection film, and a second glass plate; and the virtual image display apparatus according to claim 1.

11. The head-up display system according to claim 10, wherein the P-polarized light reflection film has a layer consisting of a cholesteric liquid crystal.

12. The head-up display system according to claim 10, wherein the P-polarized light reflection film has a layer formed by laminating an optically anisotropic layer and an optically isotropic layer.

13. A transportation machine comprising:

the head-up display system according to claim 10.

* * * * *